UNITED STATES PATENT OFFICE.

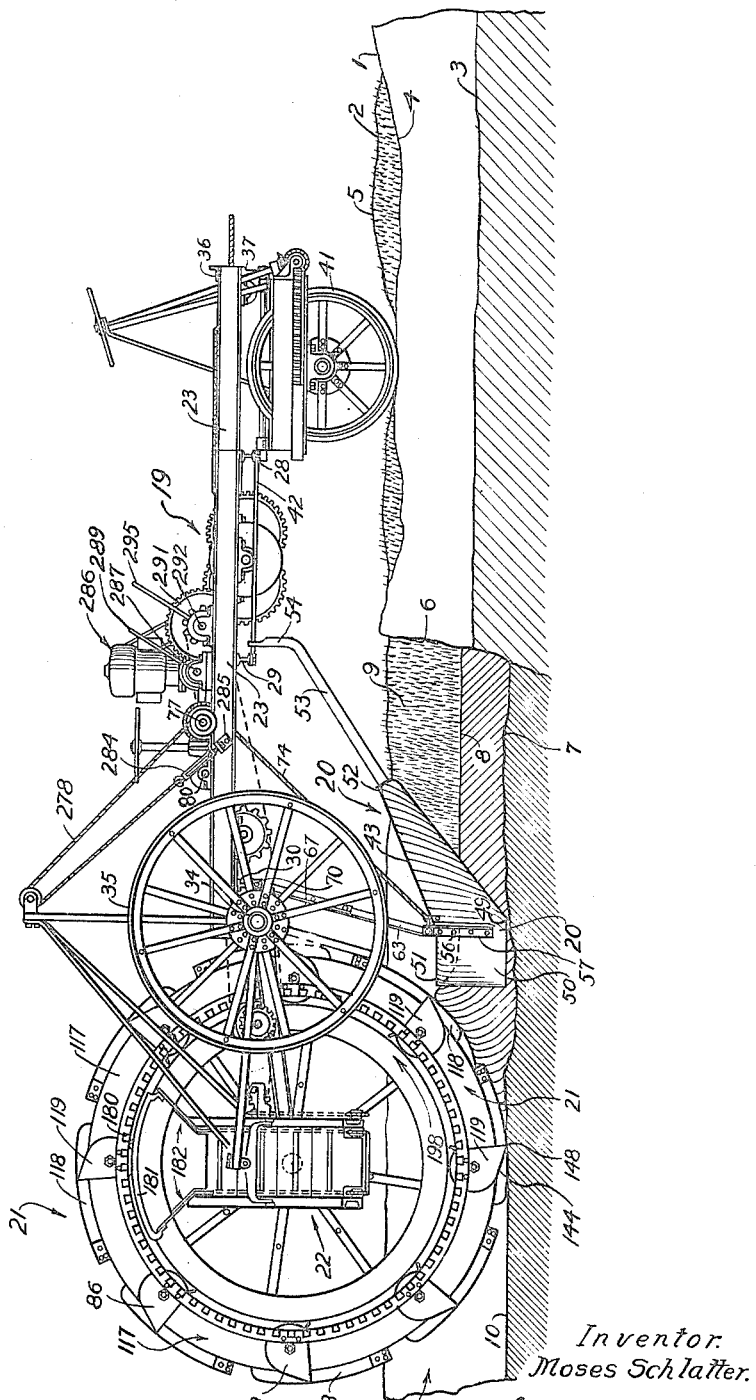

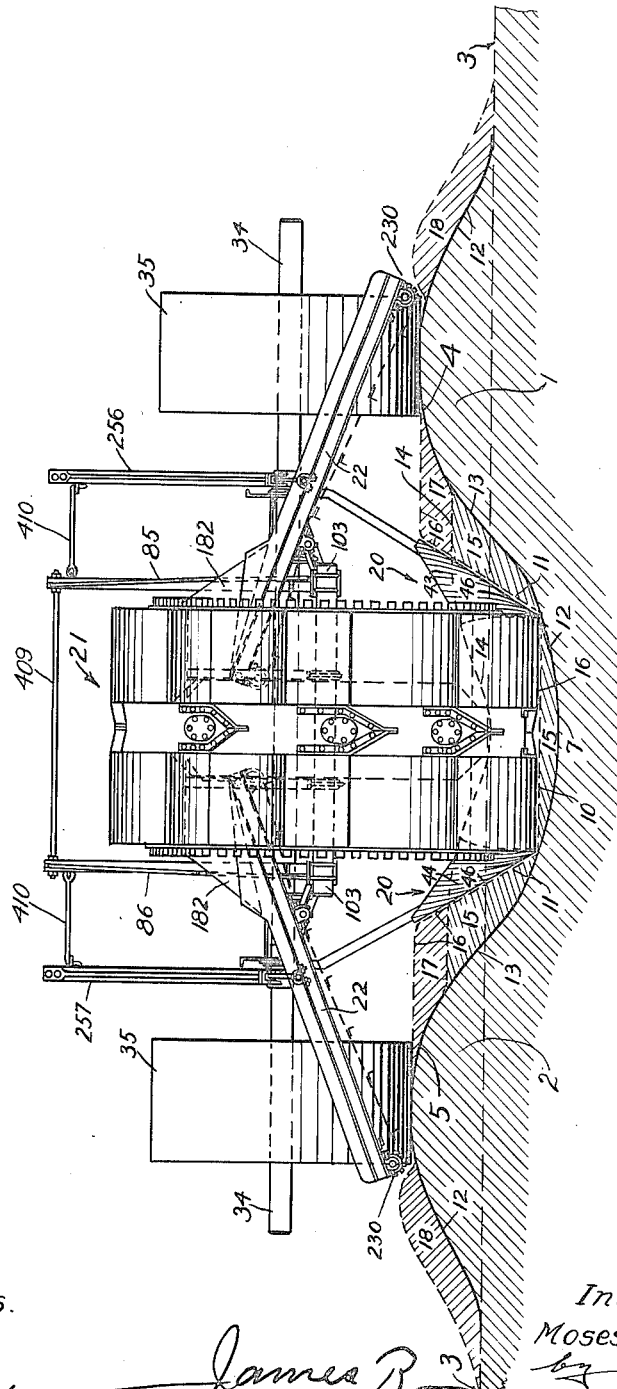

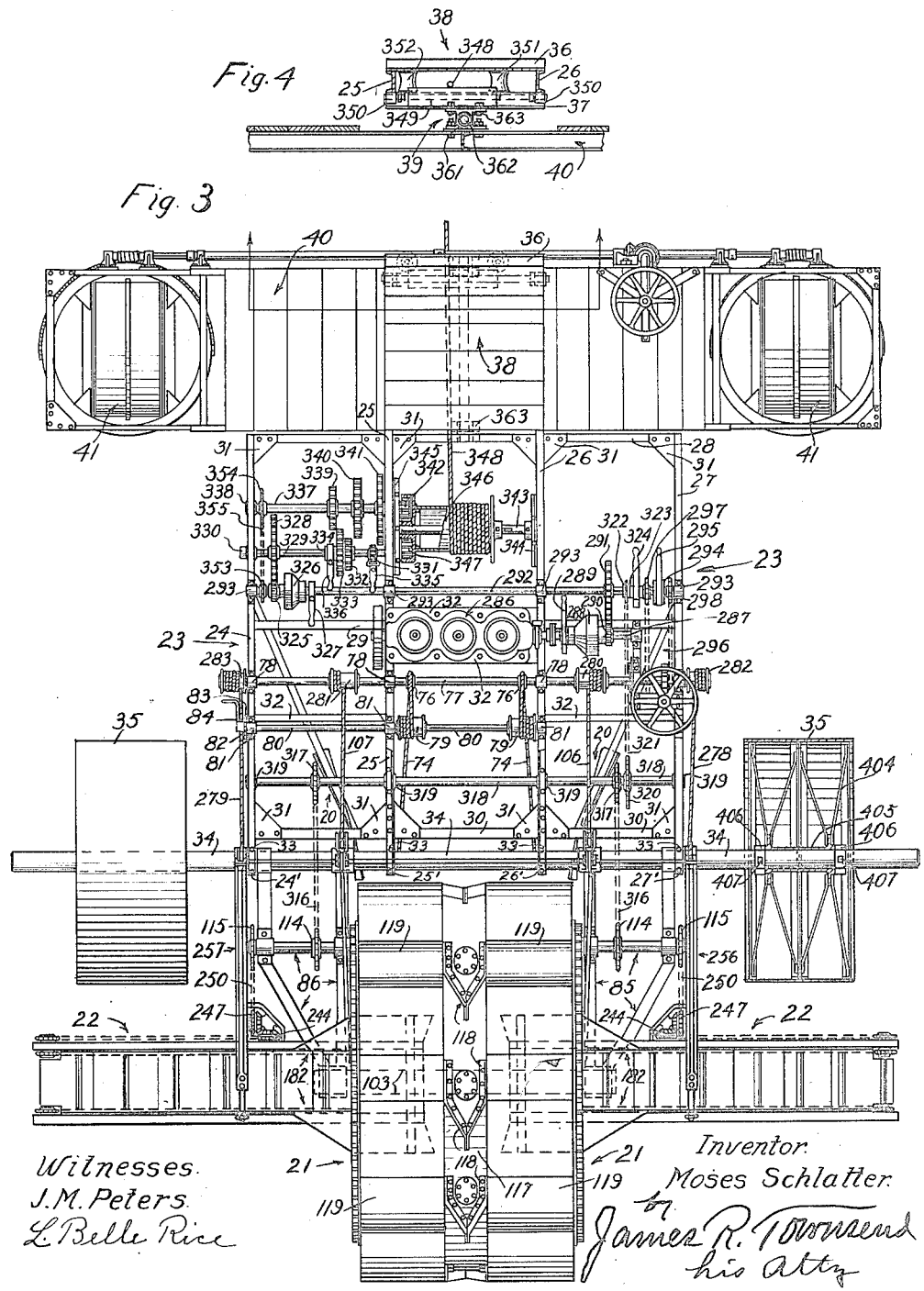

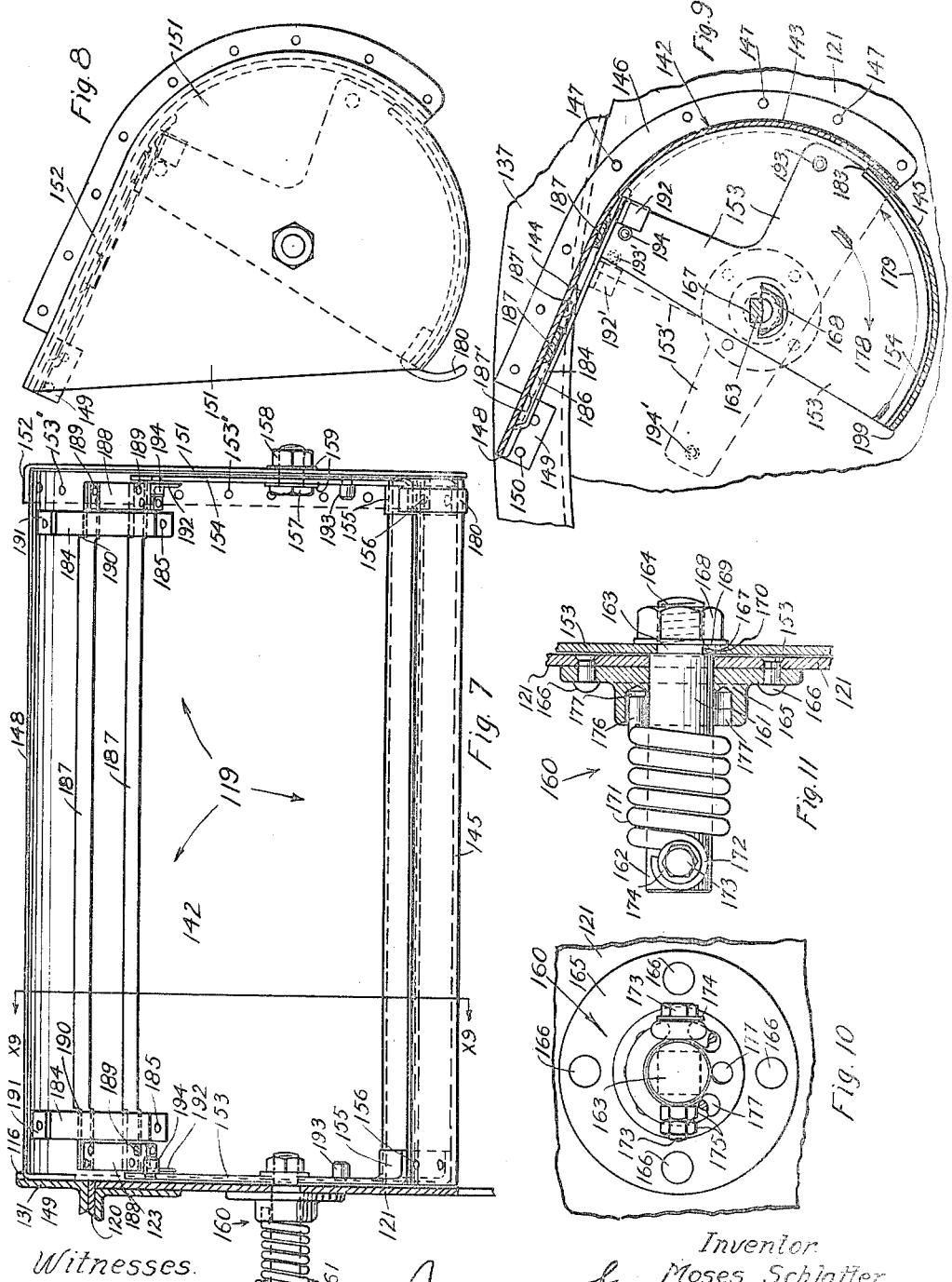

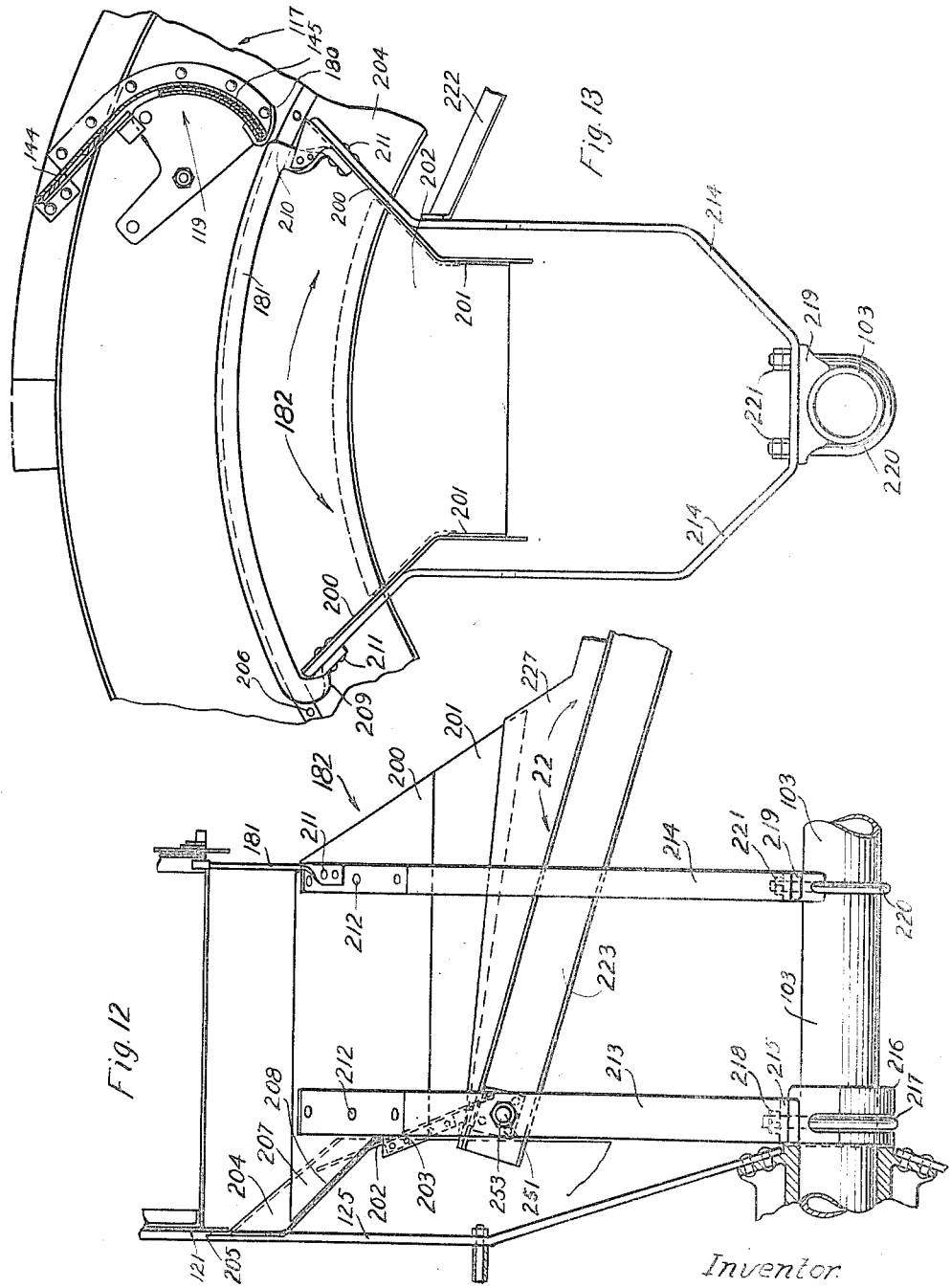

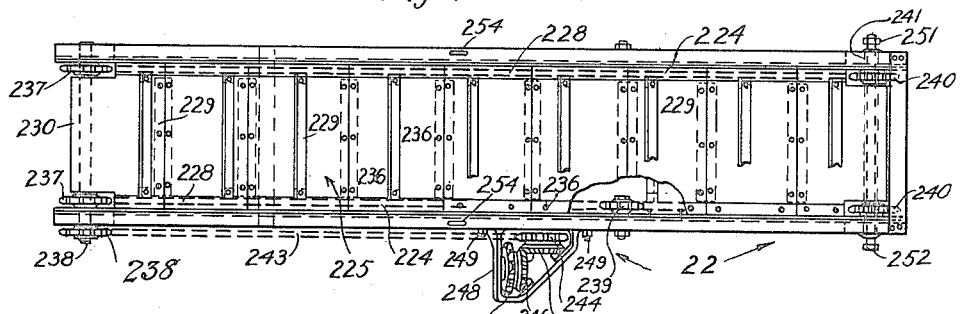
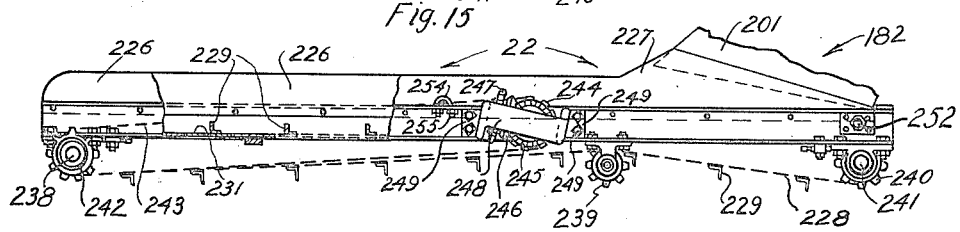
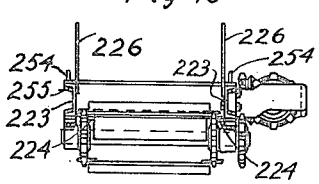
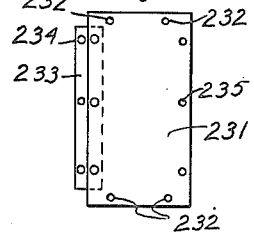
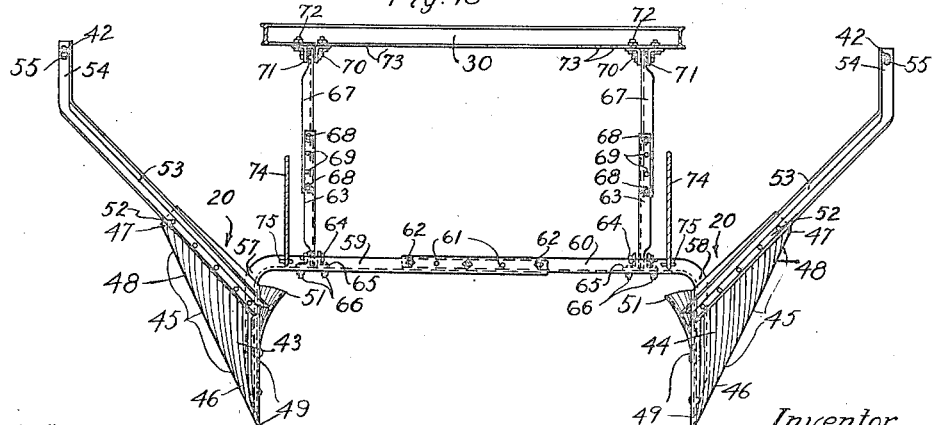

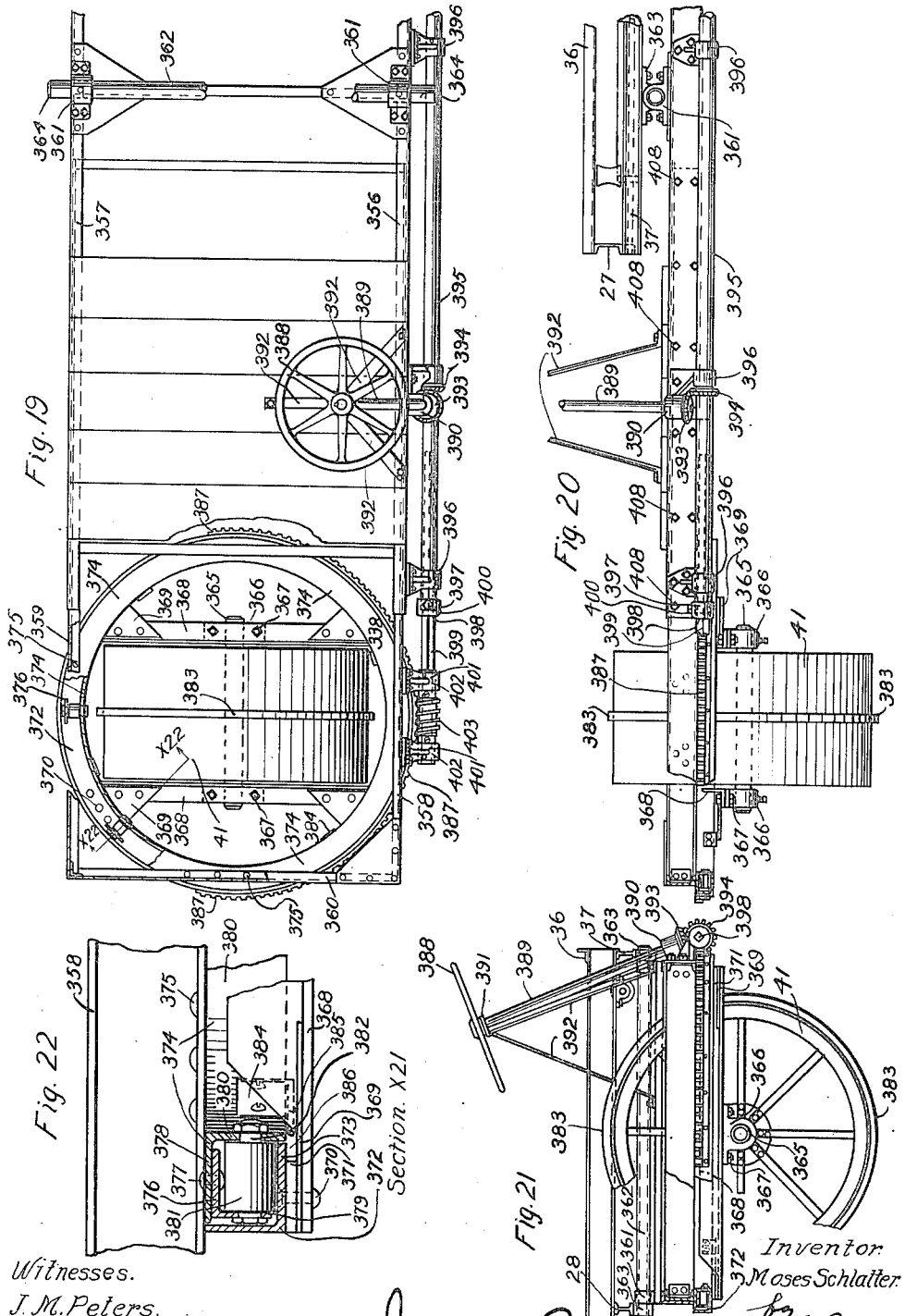

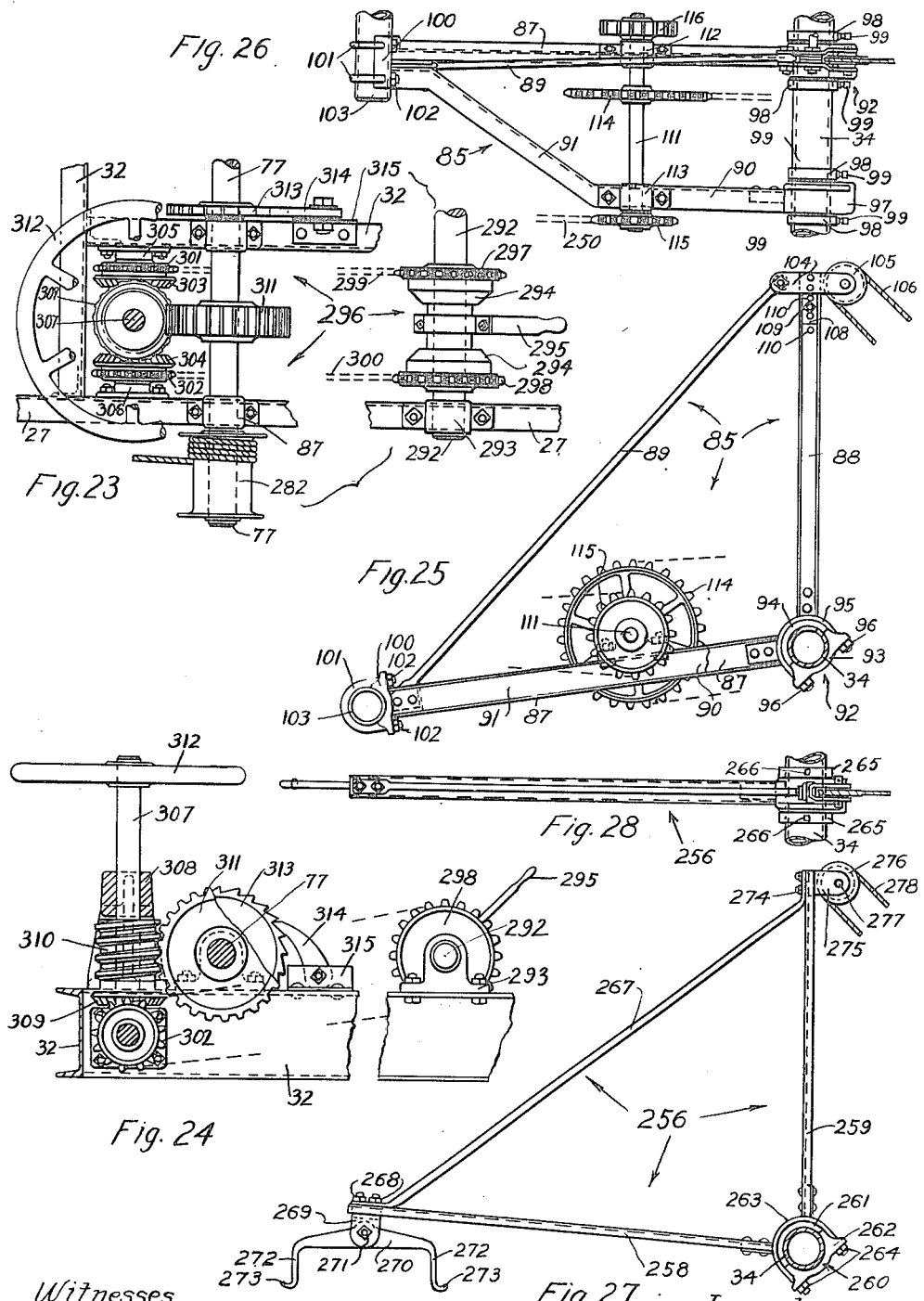

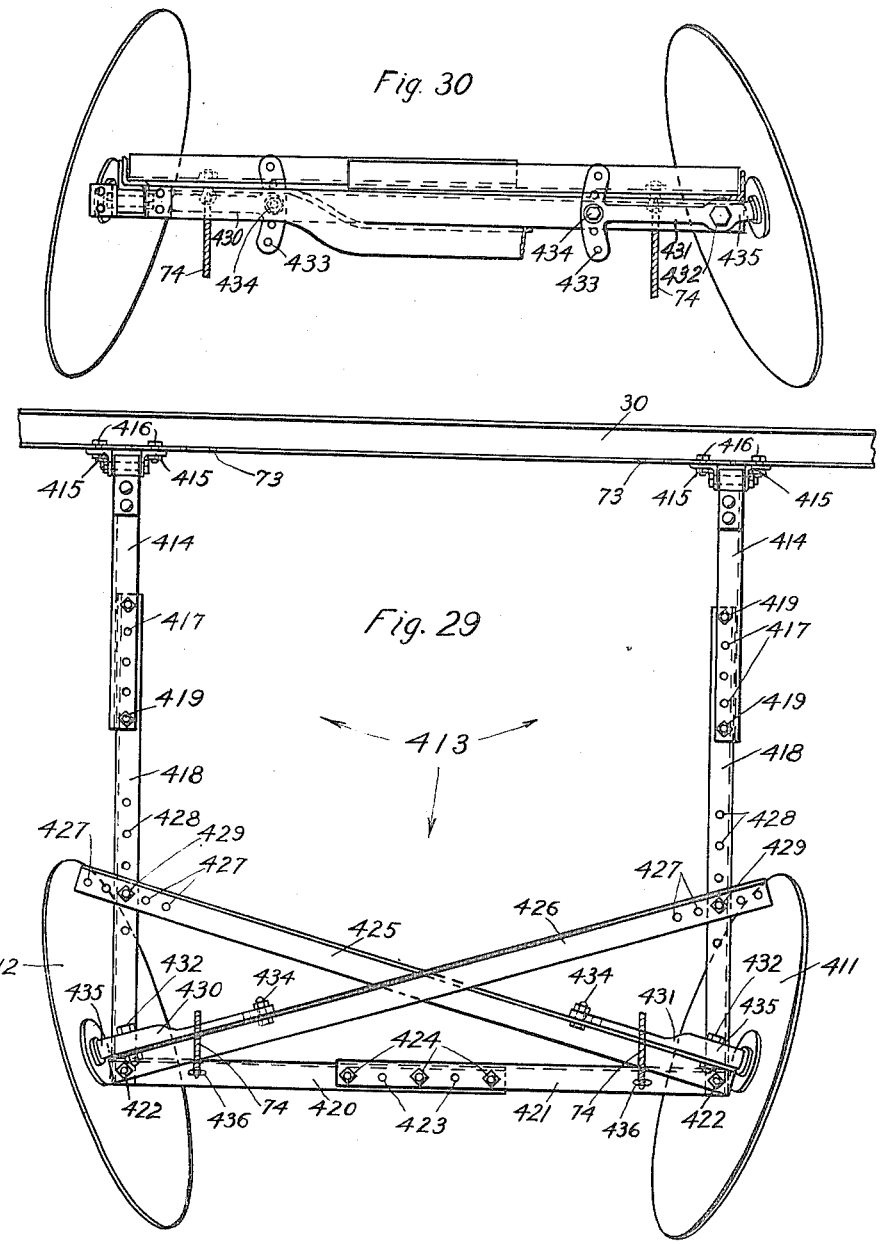

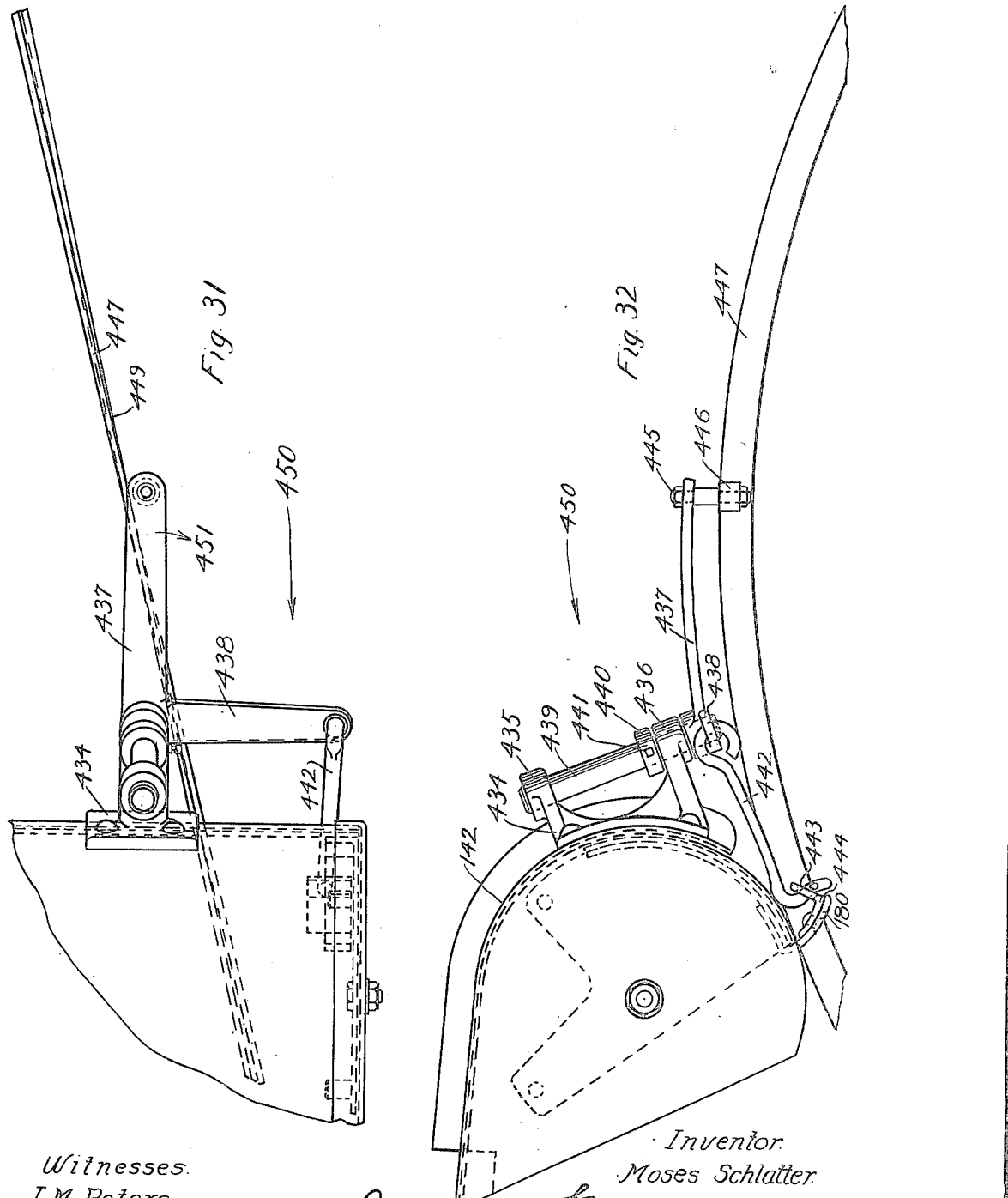

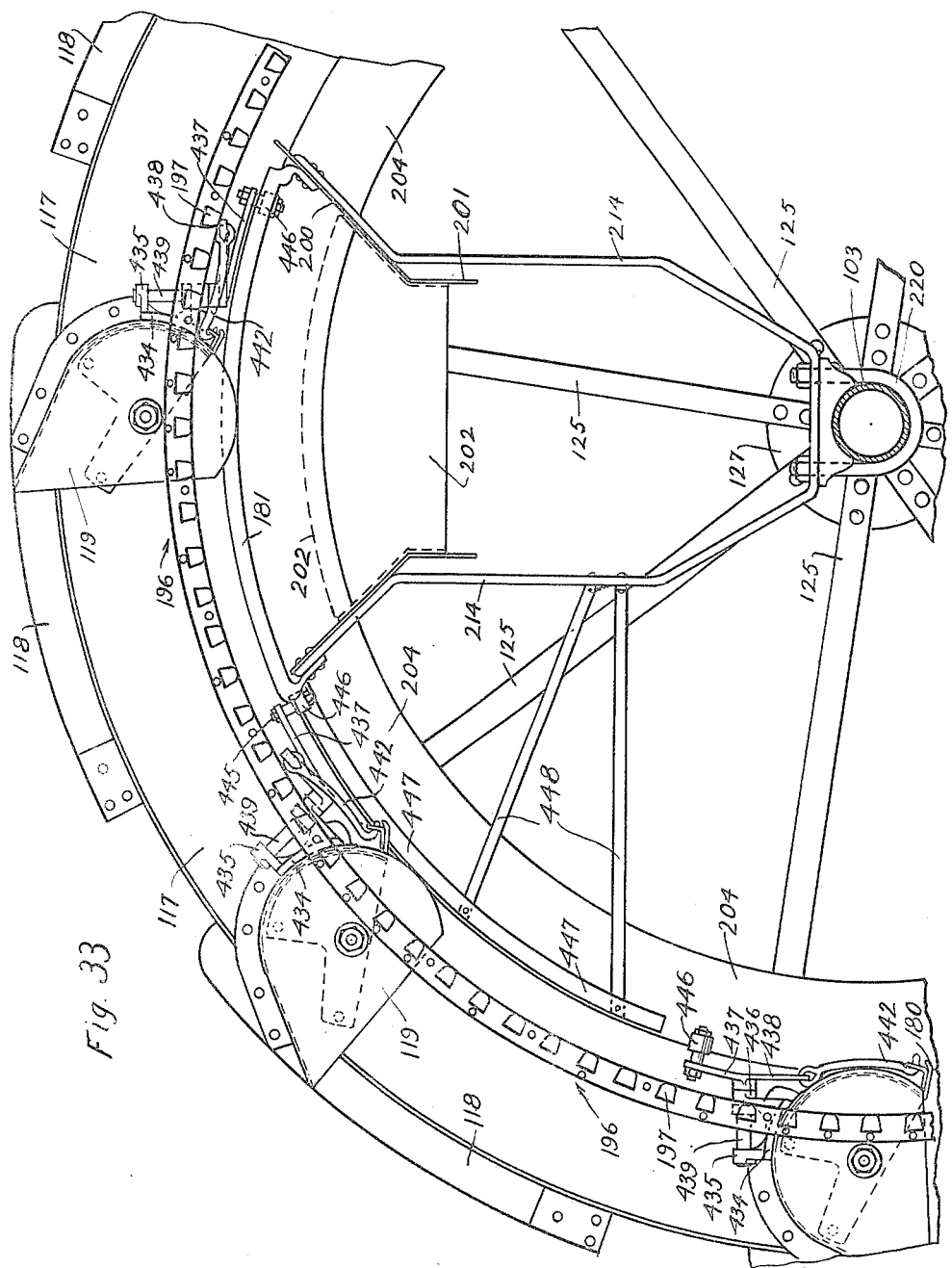

MOSES SCHLATTER, OF HOLLYWOOD, CALIFORNIA.

COMBINED DITCH CLEANER AND FORMER.

1,239,727. Specification of Letters Patent. Patented Sept. 11, 1917.

Application filed December 26, 1912. Serial No. 738,762.

*To all whom it may concern:*

Be it known that I, MOSES SCHLATTER, a citizen of the United States, residing at Hollywood, in the county of Los Angeles and State of California, have invented a new and useful Combined Ditch Cleaner and Former, of which the following is a specification.

In certain sections of the United States and other parts of the world, where arid or desert land is reclaimed to agriculture by a system of irrigating ditches or canals leading or distributing water onto the said arid land, or in sections where systems of canals or ditches are used for drainage or any other purposes, considerable inconvenience, delay and loss of wealth is often caused by the deposit of sediment from the contained water, which deposit tends to choke the canal or ditch so as to seriously impair its water-carrying capacity. In connection with irrigation projects where a definite quantity of water must be in constant readiness to flow upon and support a growing crop, the loss sometimes occasioned by the aforesaid choking of the ditch may be considerable. Particularly does this problem become vexatious in such regions as the Imperial Valley in California, the Yuma district in Arizona, and other sections irrigated by the waters of the Colorado river, the sedimentary deposit from these waters being abnormally heavy and being removed only with difficulty from the canal or ditch in which it settles. When wet, this peculiar deposit is sticky and waxy and hangs together quite tenaciously, these properties accounting for the difficulty of its removal from the ditch. When such a deposit is handled with a shovel or other removing implement, the aforesaid properties cause it to cling to the implement and difficulty is experienced in detaching and discharging it from the same. Water, of course, is constantly standing in, and may be demanded from these ditches, practically at any time, so that the cleaning operation must be performed on the wet deposit, and the frequency with which the ditches in this locality become choked, together with the difficulty of handling the wet deposit, make the up-keep of these ditches quite expensive.

The ditches are usually constructed with a standard bottom width, ranging approximately from three to ten feet, but the width across the top varies considerably, either at different points along the same ditch or in different ditches having the same bottom width, the aforesaid variation depending on the skill and judgment of the builder. In the usual mode of constructing these ditches, one or more horses are attached to a scraper and are driven back and forth transversely or perpendicularly across the line on which the ditch is to be constructed. An operator manipulates the scraper in such manner as to draw the sand or soil to either side of the contemplated ditch and dumps same there. As this scraping action continues, a longitudinal groove is gradually depressed deeper and deeper along the prospective ditch line and into the originally level surface of the land, and the matter removed from said groove is dumped equally on either side of the groove to form elevated mounds above the level of the land. The space between the crests of said mounds and extending down into said longitudinal groove, is termed the ditch, and the mounds rising above the normal level of the land are termed the ditch banks.

Ditches constructed in accordance with the above method contain certain inherent defects now to be described.

The bottom of such a ditch is scraped as flat and horizontal as the operator's skill will permit, and the sides, merging into and including the ditch banks, are built along a gradual upward slope in order that the horses can climb it and drag the scraper up onto it in the course of the ditch construction.

As a rule, the sides of such a ditch are inclined less than thirty degrees with a horizontal plane, and will allow the water to spread out wide onto the gradually sloping submerged sides. This will present an excellent field on which weeds and aquatic foliage will grow thickly.

These aquatic growths offer considerable resistance to the flow of water by and adjacent the same, and the rate of fluid flow in their portion of the ditch being thereby materially decreased, the depositing tendency of the water will be materially and proportionately increased.

Furthermore, the thick foliage will act as an excellent screen across the flowing water and will collect and deposit in the ditch much sediment that might otherwise have escaped onto the surrounding land in the natural course of irrigation.

From the foregoing two paragraphs, it is seen that the inherent gradual slope of the ditch sides, as originally constructed, causes an unduly rapid depositing action and the consequent rapid choking of the ditch materially increases the annual expense of the same.

Furthermore, the water spreads wide across such a ditch and the surface from which evaporation occurs is large, so that the water lost into the hot dry air of the desert will be considerable. Water in these arid fields having a considerable value the annual loss from this excessive evaporation is appreciable.

As at present cleaned, heavy scrapers or other implements are adapted to travel along the ditch, the implements being principally supported on one bank only, and the cleaning being performed by drawing the sedimentary deposit upward and outward onto that ditch bank whereon the cleaner is principally supported. These implements clean only that half of the ditch adjacent the bank on which they are principally supported, and are therefore drawn along the ditch twice, once on each ditch bank, so as to effect the cleaning of the whole.

The operation of these cleaners involves certain defects as follows:—

Being supported principally on one ditch bank, and the cleaning means re-acting downwardly and transversely of the ditch, an undue weight or force is created on one ditch bank, and the said force acting downwardly and transversely inward, tends more or less to cringe, crumble or slide the bank sidewise into the ditch.

Furthermore, these cleaners merely remove the deposit from the ditch and in no way improve its original shape or remove the inherent defects aforesaid.

My invention relates to practical efficient means for restoring into operative condition any ditch or canal, located anywhere, and used for conducting water in the course of irrigation, drainage, or any other projects, which ditch may have been choked by a deposit of silt, mud or sediment of any description and thereby rendered incapable of carrying its requisite water capacity. More particularly, however, my invention relates to a ditch cleaner and former for removing any silt, mud or sediment having the sticky, tenacious and clinging properties of the Imperial or Yuma deposit referred to above; and the particular cleaner embodying my invention embraces also means adapted to coöperate with the said silt-removing means for simultaneously operating on the bottom and on both sides of the ditch, so as to form or re-form the original shape and contour of the ditch and avoid its inherent defects referred to above.

An object of my invention is to provide means for handling any grade of wet or dry silt, and more particularly to handle wet silt of a sticky, tenacious and clinging variety similar to that above described. To this end I provide rotatably mounted silt removing and holding means, the same being generally referred to as buckets in the following description and in the appended claims, and the said buckets are adapted to scoop into and remove the silt from the ditch, and are provided with novel means for scraping, loosening or detaching the silt from their sides when the buckets reach their discharging position.

Another object is to provide means which shall simultaneously form or re-form the original gradually sloping sides of the ditch, so as to obviate the inherent aforesaid defects of same. To this end I provide novel forming means constituting two knives, one for each side of the ditch, and each having a downwardly and an inwardly extending cutting edge adapted to form the ditch sides along a downwardly and inwardly extending slope inclined 70 degrees or more with respect to a horizontal plane. Though more advantageous than the original shape, it is not perfectly satisfactory to form the ditch side and bank into a substantially vertical surface since the bank and sides then tend to crumble and cave inward toward the ditch.

Another object is to provide means for removing the silt along a perfectly straight level and horizontal bottom line lying transversely across the ditch, so as to leave a perfectly plane and clean bottom behind the advancing cleaner. To this end I provide novel silt removing means comprising a wheel rotatably mounted above the ditch and having its axis perpendicular to the length of the ditch, said wheel having dividers mounted around and extending radially from the periphery of the rim for removing silt from below said rim toward either side, and the wheel also having horizontal straight-edged buckets extending from both sides and adapted to scoop into and remove the silt from said ditch, the horizontal and straight scooping edge of the buckets having the same radial distance from the wheel axis as the extreme edge of the dividers.

Another object is to provide means for building up and reshaping the banks and sides of the original ditch so as to conform more thoroughly to a perfect ditch shape. To this end I provide novelly mounted and novelly constructed conveying means for carrying toward either ditch bank the silt which has been removed from the ditch, said conveying means having removable bottom sections whereby the silt may be discharged onto or at different distances from either ditch bank.

Another object is to simultaneously clean the ditch, and form each and every part of same so that the whole is made to conform to a perfect ditch shape. To this end I provide a novel operative, practical and ingenious combination of means for removing the deposited silt; for forming the sides along a seventy degree slope, for forming the bottom on a perfectly horizontal level line across the ditch; and for building up and extending the original ditch banks on either side of said ditch.

Another object is to provide a cleaner adapted to travel along the ditch said cleaner being mounted on wheels equally supported on both sides of the ditch, so that each bank, or each built-up addition to the bank, may be rolled hard under a pure vertical force, and wherein the sideward, cringing and sliding tendency of the cleaners now in use, may be avoided.

Another object is to provide a cleaner for ditches having one standard width across the bottom, said cleaner being equally and always supported on both sides of said ditch regardless of the varying distances between the ditch sides or banks. To this end I mount the silt-removing means on a novel ditch vehicle, the same having forward and rearward supporting wheels transversely adjustable on the vehicle and means for permitting the transverse adjustment of said wheels. In view of this feature also the wheels at one time may be run on one portion of the ditch banks, and at another time on another portion of the ditch banks, so that the built-up additions to said banks may, on successive traverses of the cleaner, be rolled hard and made a permanent portion of the bank.

Another object is to provide a cleaner well-adapted to travel along a ditch and to always receive support from each of its four supporting wheels regardless of the altitude variations in the upper contour of the ditch banks. To this end I provide a novel ditch vehicle adapted to carry the silt removing means, said vehicle comprising a frame having two rear supporting wheels and a forward two-wheeled truck pivotally attached to said main frame in such manner that the truck will always be maintained perpendicular to the length of the main frame, and in such manner that the truck is susceptible of a pivotal motion about an axis running centrally through the main frame and parallel to the length of said frame. The wheels of such a vehicle will always rest on the ditch banks and perform their supporting function whether their points of support lie in a single plane or not, and in view of the great weight of the whole device and the usual uneven upper contour of the banks, this feature becomes essential to the successful operation of a ditch cleaner.

Another object is to provide a ditch cleaner which may be readily and conveniently steered under the peculiar service required of same. To this end I provide novel adjustable steering means for the dirigible wheels on the forward truck, said dirigible wheels being so mounted that the operator may cause an unlimited rotation of said wheels about a vertical axis passing through the centers.

Another object is to effect, in a single ditch cleaner, a novel operative and ingenious combination of means whereby the same may be adapted to travel along ditches having variable distances between the ditch banks; and adapted to receive adequate and constant support from its four wheels regardless of altitude variations in the upper contour of the banks; and also adapted to be conveniently steered under the peculiar service to which ditch cleaners are subject.

Another object is to provide a ditch cleaner whereby a substantially flat, level and horizontal bottom may be formed along the length of the ditch, regardless of altitude variations in the upper contour of the ditch banks. To this end I provide a vehicle having silt removing and silt conveying means adjustably mounted on same, and having power-driven means connected to said silt-removing and said silt conveying means whereby power may be applied to either raise or lower the vertically adjustable silt removing and silt conveying means simultaneously and rapidly, an attendant applying said power in the appropriate direction to lower or raise the silt removing and silt conveying means as the vehicle travels over high or low points on the banks.

Another object is to provide a cleaner which shall effectively scoop into and remove the silt from a ditch containing water, without removing any appreciable quantity of the water from the ditch. To this end I provide novel rotatably mounted buckets operated in such manner that substantially all the water that has been scooped along with the silt shall spill back into the ditch. In view of the value of irrigation water this feature is essential to the successful operation of a ditch cleaner.

Other objects may become clear by reading the following detail description, and by inspecting the drawings of this application.

The accompanying drawings illustrate the invention.

Figure 1 is a side elevation of my assembled ditch cleaner and former and shows a longitudinal section along the ditch, one bank having been partly removed to display the forming and silt removing means in actual operation. In front of the forming and silt removing means the interior of the ditch is shown in its original and silted condition and behind the forming and silt removing means the ditch is shown in its final formed and cleaned condition.

Fig. 2 is a rear elevation of my assembled ditch cleaner and former and shows a transverse section across the ditch banks indicating the ditch shape as originally constructed, and also the reformed ditch shape after my cleaner and former has operated on same. This figure shows also the up-built additions to the ditch bank which may be constructed by my ditch cleaner.

Fig. 3 is a plan view of my assembled ditch cleaner and former.

Fig. 4 is a partial front elevation of my ditch cleaner and former and shows the pivotal mounting between the main frame and the forward truck of the vehicle.

Fig. 7 is an enlarged detail plan of one of the buckets used on my cleaning or silt removing means. This figure indicates said bucket attached to the wheel and divider and shows the means for resetting the bucket parts after the silt has been loosened, scraped and discharged from same.

Fig. 8 is an end detailed elevation of the bucket shown in Fig. 7.

Fig. 9 is a section of the same bucket on line $x^9$—$x^9$, Fig. 7, the full lines indicating the normal position of the bucket parts and the dotted lines indicating the limiting position attained by the bucket parts as the silt is being loosened, detached, and discharged from same.

Fig. 10 is an enlarged end elevation of the means for resetting or returning the bucket parts to their normal position after the silt has been loosened, detached and discharged from same.

Fig. 11 is a side elevation partly in section of the same means shown in Fig. 10.

Fig. 12 is an enlarged detailed side elevation of the hopper used for conducting the silt discharged from the buckets, this figure also showing a fragmental section of the wheel and guiding apron as the latter is being cleaned by the side walls of the hopper.

Fig. 13 is a front elevation of the hopper shown in Fig. 12, and additionally illustrates a section through a bucket in its discharging position.

Fig. 14 is an enlarged plan view of the conveying means showing the removable bottom sections whereby the silt may be discharged onto or at different distances from the ditch bank. For purposes of clearness, portions of the conveyer have been broken away.

Fig. 15 is a side elevation of the same conveying means shown in Fig. 14. For purposes of clearness, portions of the conveyer have been broken away.

Fig. 16 is an end elevation of the same conveying means shown in Fig. 14.

Fig. 17 is an enlarged detailed view of a bottom section used in the conveyer and is shown detached from same.

Fig. 18 is an enlarged front elevation of the complete forming means for shaping the sides of the ditch, and shows the means for bracing and mounting same on the vehicle.

Fig. 19 is an enlarged detailed plan of a portion of the forward truck. For purposes of clearness, portions have been broken away.

Fig. 20 is a front elevation of the same portion of the forward truck shown in Fig. 19. For purposes of clearness, portions of the truck have been broken away.

Fig. 21 is an end elevation of the forward truck shown in Fig. 19. For purposes of clearness, portions of the truck have been broken away.

Fig. 22 is an enlarged detail section taken along line $x^{22}$—$x^{22}$, Fig. 19.

Fig. 23 is an enlarged detailed section of the means for vertically adjusting the silt removing means and the conveying means, and shows the arrangement whereby power is applied to effect either the upward or downward adjustment of said means. For the purposes of clearness and economy of space, portions of the frame and other parts have been broken away.

Fig. 24 is a side elevation partly in section of the same means shown in Fig. 23. For purposes of clearness and economy of space, portions of the frame and other parts have been broken away.

Fig. 25 is an enlarged detailed elevation of the triangular hanger whereby the silt removing means is adjustably mounted on the vehicle and this figure shows additionally the driving means for said silt removing means, and the silt conveying means.

Fig. 26 is an enlarged detailed plan of the triangular hanger shown in Fig. 25.

Fig. 27 is an enlarged detailed elevation of the triangular hanger whereby the conveying means is adjustably mounted on the vehicle.

Fig. 28 is an enlarged plan of the hanger shown in Fig. 27.

Fig. 29 is an enlarged front elevation of modified forming means which I sometimes contemplate using for shaping and cutting the sides of the ditch.

Fig. 30 is a plan view of the modified forming means shown in Fig. 29.

Fig. 31 is a plan view of the positive return mechanism which I contemplate using for positively returning the bucket members to their normal position. The return mechanism is shown connected to a fragment of a bucket.

Fig. 32 is a side elevation of the same positive mechanism and shows the same attached to a bucket.

Fig. 33 is an enlarged fragmental side elevation of the cleaning or silt removing means shown in Fig. 6, with the addition of the positive return mechanism for the buckets.

Figure 5:
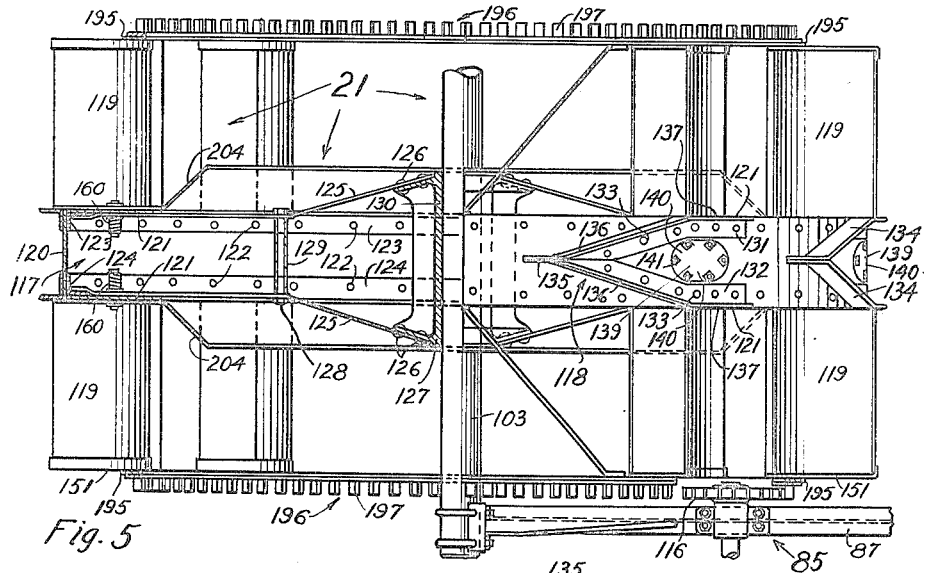
Fig. 5 is an enlarged plan of the cleaning or silt removing means used in my ditch cleaner and former. The right-hand half of this figure shows in full the wheel, the dividers, and the buckets comprising said silt removing means, and the left-hand half shows an axial section taken through the same.

The nature of the silted irrigation ditch is illustrated in Fig. 1 where my cleaner is shown in the course of operation. In this figure the forward portion of the cleaner is seen to be supported on the two ditch banks 1 and 2 rising above the normal land surface 3; and the altitude variations in the upper contours 4 and 5 of the two banks respectively, show the character of path over which the cleaner sometimes passes. To the left of the broken line 6 the ditch bank 1 is broken away to show the original ditch bottom 7, the deposited silt 8, and the weeds and aquatic growths 9 on the sides of the original ditch. For purpose of clearness the water contained by the ditch is not indicated in this figure, and the section line along which the silt 8 is shown is taken through the center of the ditch. At the extreme left portion of Fig. 1 the ditch is shown having a perfectly straight, flat, cleaned and re-formed bottom 10, and having cleaned and re-formed ditch sides 11, the same being shown as they appear after the ditch cleaner and former has operated on them.

Fig. 2 illustrates a transverse section across the ditch, and shows the original ditch contour by means of line 12. This line starts from the normal land surface 3, rises over the original ditch bank 5, slopes gradually downward along the original ditch side 13 into the approximately flat original ditch bottom 7, and then rises in the same manner over the original ditch bank 4 back to the original land line 3. The curved dotted line 14 extends across the ditch and shows the height and contour along which the silt 15 has been deposited onto the original ditch bottom 7 and original sides 13. The broken dotted line 16 illustrates the contour of the cleaned and re-formed ditch after operation of the cleaner and former, this line embracing the re-formed straight ditch bottom 10 and the comparatively steep re-formed straight ditch sides 11. The sectioned areas 17 and 18 in this figure represent the upbuilt portions which may be added on either side of the original ditch banks 1 and 2 by operation of my cleaner and former, these portions being hereinafter more particularly referred to.

Now directing attention to my cleaner and former itself and viewing it broadly as in Fig. 1, the same is seen to comprise a power-driven ditch vehicle 19, forming means 20 for forming the sides of the ditch, cleaning or silt-removing means 21 which will also form the bottom of the ditch, and silt-conveying means 22.

The ditch vehicle 19 comprises a main frame 23 built up of four longitudinal channel beams 24, 25, 26 and 27, Fig. 3, lying parallel to the length of said main frame. Three cross beams 28, 29 and 30 of I-section are laid transversely of and attached by any suitable means 31 to the four said longitudinal channel beams, and bind the whole into a rigid substantial main frame 23. Other suitable braces and cross-pieces 32 are riveted or otherwise suitably attached to this main frame for the purpose of affording a substantial support for auxiliary mechanism to be later described.

To the rear portions 24', 25', 26' and 27' of the longitudinal channels, respectively extending beyond the cross beams 30, is attached, by suitable U-bolts 33, the transverse hollow shaft 34 extending completely across the main frame, said shaft adjustably carrying the rear supporting wheels 35 on its outer extremities.

The two inner longitudinal channel beams 25 and 26 extend beyond the cross beam 28 and are riveted to and braced at their forward extremities by the members 36 and 37, thus forming the square forward projection 38 of the main frame.

To the lower side of this forward projection 38 is pivotally secured, by means 39 Fig. 4, the forward truck 40 Figs. 3 and 4, the said truck carrying near its extremities, the dirigible and transversely adjustable supporting wheels 41, the construction of said truck and wheels being hereinafter more fully described.

On both sides of the vehicle and below the ends of the cross beams 28 and 29, are secured guide-rods 42, and from each guide-rod, together with the cross beam 30 is suspended the forming means 20 for operating on the ditch sides and banks.

The details of said forming means are best illustrated in Figs. 1, 2, 3 and 18, and are seen essentially to comprise two novel knives 43 and 44, one for each side of the ditch. The surface of these knives is curved in a novel manner to adapt them to their particular service, but their basic surface, along which the cutting edge is formed, and from which the curved portions extend, comprises a plane 45 Fig. 18 lying parallel to the length of the ditch and inclined inwardly and downwardly toward the ditch. Extending downwardly and rearwardly along this plane is the straight cutting edge 46 adapted to cut the silt away from the ditch sides along the portion 11 of line 16 Fig. 2, thus forming the ditch side and giving same an inclination of substantially seventy degrees.

Somewhat above the cutting edge 46 the aforesaid downwardly and inwardly inclined basic plane 45 is warped into a more or less vertical plane 48 thus removing the inward inclination of plane 45. This warping is indicated by the shading in Fig. 18, and is gradual near the knife extremity 47, and is very abrupt near the rear of said knife, so that the said plane is perfectly vertical above and behind point 49 on the cutting edge, Figs. 1 and 18. Behind the point 49 the knife is continued into the rear extension 50, the lower portion of which lies in a perfectly vertical plane and the upper rear portion of which is warped inward into the inwardly and downwardly deflecting portion 51.

The warp whereby the inclined plane 45 is curved into the vertical plane 48, and whereby the deflecting portion 51 is curved from said vertical plane, is practically continuous across the whole knife surface and causes same to operate on the silt with a rolling and deflecting operation very similar to that caused by the mold-board of any ordinary plow. As the knife is drawn forward and the ditch sides are cut by the straight inclined edge 46 the silt is guided along the inclined plane 45 and is gradually raised onto the substantially vertical knife plane 48. When the point 49 is reached the silt will have been completely turned from its inclined position and caused to assume a vertical position, and when the rear deflecting portion 51 is reached said vertically standing silt will be rolled inward and somewhat downward toward the center of the ditch. As will be hereinafter explained this inward and downward rolling of the cut silt will place same in a satisfactory position for the operation of the silt-cleaning or removing means 21 which follows immediately behind the forming means 20.

The means whereby the knives 43 and 44 are adjustably attached to and drawn by the vehicle 19 will now be described.

Each knife is attached by rivets 52 to a knife hanger 53, the forward extremity of said hanger being bent into the upright portion 54 having therein an aperture 55 adapted to loosely embrace the guide bar 42.

Across the outer face of each of the knives 43 and 44 and behind the point 49 are attached by rivets 56 upright angle sections 57 and 58 respectively, one for each knife, these upright sections being bent inward over the knife so as to form the horizontal portions 59 and 60 which are adjustably attached to each other between the knives.

One of the angle legs of each of these horizontal portions is provided with a series of adjusting apertures 61 through which pass bolts 62 whereby said horizontal portions are attached to each other. From each of the horizontal portions also rises a vertical angle section 63 pivotally secured to the same by pin 64 carried between clips 65, the latter being attached to said horizontal portions by bolts 66. Two similar vertical angle sections 67 are attached to the aforesaid angle sections 63 by means of bolts 68 passing through a series of adjusting apertures 69 in one leg of each of the angle sections 63 and 67. These upper angle sections 67 are pivotally attached to the cross beam 30 by means of pins 70 which are carried between two clips 71 the same in turn being adjustably attached to the cross beam 30 by means of bolts 72. On the cross beam 30 a series of adjusting apertures 73 are provided for the attaching bolts 72, said series 73 being spaced similar to the series 61 of the horizontal angle portions 59 and 60.

Through the agency of the several foregoing series of adjusting apertures the knives 43 and 44 are susceptible to the adjustments following:

By passing bolts 62 through different apertures of the series 61 in the horizontal portions 59 and 60, and by passing the bolts 72 through the corresponding apertures of the series 73 in the cross beam 30, the rear portion of the knives 43 and 44 will be brought together, thereby varying the inclination of said knives, since the forward supporting point on the guide bar 42 is not changed.

By passing the bolts 68 through different apertures of the series 69, the knives may be vertically adjusted to run at different distances below the vehicle 19.

Sometimes also when the cleaner is traveling across country to or from ditches, or is crossing roads, bridges, etc., it is desirable and necessary that the knives 43 and 44 be raised from their operative position and such raising is provided for in the following manner.

The vertical sections 63 and 67 being pivotally connected to the horizontal portions 59 or 60 and to the cross beam 30 respectively, and the knife hangers 53 being slidably mounted along the guide-rod 42, it will be clear, Fig. 1, that the knives 43 and 44 may be raised pivotally about the pins 70 until they lie against the main frame 23 of the vehicle. In order that the knives may be conveniently raised in this manner the two cables 74 are provided, the same being attached to the horizontal portions 59 and 60 by any suitable means 75. These cables are carried around the idlers 76, Fig. 3, loosely mounted on shaft 77, this shaft being supported on the main frame 23 by means of bearings 78; and this shaft also carries cable-winding mechanism to be described later. From the idlers 76 the cables 74 pass around and are attached to winding drums 79 rigidly carried on shaft 80, this shaft being supported on the main frame 23 by the bearings 81. At its outer end said shaft 80 carries a ratchet wheel 82, a pawl 83, and a hand crank 84, whereby the shaft 80 and drums 79 may be rotated to wind up the cables 74 and raise the knives from their operative position up to the main frame 23 as aforesaid.

From the foregoing it will be seen that the means for forming the ditch sides may be conveniently operated and variously adjusted so as to most adequately coöperate with the cleaning or silt-removing means 21 which follows immediately behind said forming means.

Now directing attention to the said silt-removing means 21 it is seen that the same is supported by triangular hangers 85 and 86, Fig. 3, one on either side of said means 21. The details of these triangular hangers are shown in Figs. 25 and 26, and the mode of mounting the same on the vehicle is shown in Fig. 3. Each hanger comprises a main channel or I-beam 87, an upright 88, a tie-rod 89 and a bracing or reinforcing extension including beams 90 and 91.

At one apex of the triangular hanger the beam 87 and the upright 88 are attached to a box 92 having the sections 93 and 94, the latter being bound together by the U-bolts 95 carrying nuts 96, and the beam 90 is provided with a similar box 97. As indicated in Figs. 3 and 26 these boxes 92 and 97 are loosely and pivotally mounted on the hollow stationary transverse shaft 34 on the vehicle, and the whole hanger is secured against transverse motion on shaft 34 by means of the adjustable thrust collars 98 having set-screws 99, said collars being attached to shaft 34 on each side of each box 92 and 97.

At another apex of the triangular hanger the beams 87 and 91, and the tie-rod 89 are attached to the box 100 having the U-bolts 101 and the nuts 102. Each of the similar hangers 85 and 86 is provided with such a box 100 and in said boxes is rigidly carried the hollow shaft 103. As will be hereinafter described the cleaning or silt-removing means 21 is rotatably mounted on said shaft 103 between the hangers 85 and 86.

At a third apex of the hanger the upright 88 and the tie-rod 89 are attached to a link 104 carrying the pulley 105 on the forward side of same. By means of the cables 106 and 107 running around the pulleys 105 of hangers 85 and 86 respectively, and operated in a manner hereinafter described, the said hangers may be pivotally rotated about the transverse shaft 34 so as to raise and lower the transverse shaft 103, thus effecting the vertical adjustment of the cleaning or silt-removing means 21. It will be seen that the link 104 has a downward projection 108 and by means of the rivets 109 passing through holes 110 in the projection 108 and upright 88, the said link may be fastened to said upright 88.

On each of the hangers is mounted certain power-transmitting mechanism as follows:— The rotary shaft 111 is supported in the bearings 112 and 113 on beams 87, and 91 respectively, said shaft carrying two sprockets 114 and 115, and a gear 116 on its inner extremity. By means to be hereinafter described power is supplied through sprocket 114 to the shaft 111 and is transmitted on the outer end through sprocket 115 to the conveying means 22, and on the inner end through the gear 116 to the cleaning or silt removing means 21.

Now directing attention to the cleaning or silt-removing means 21 as shown in Figs. 1, 2, 3, 5 and 6, the same is seen to consist essentially of a wheel 117 carrying the dividers 118 on its outer periphery and carrying the straight edged silt removing buckets 119 extending horizontally from each side of said wheel.

Figure 6:
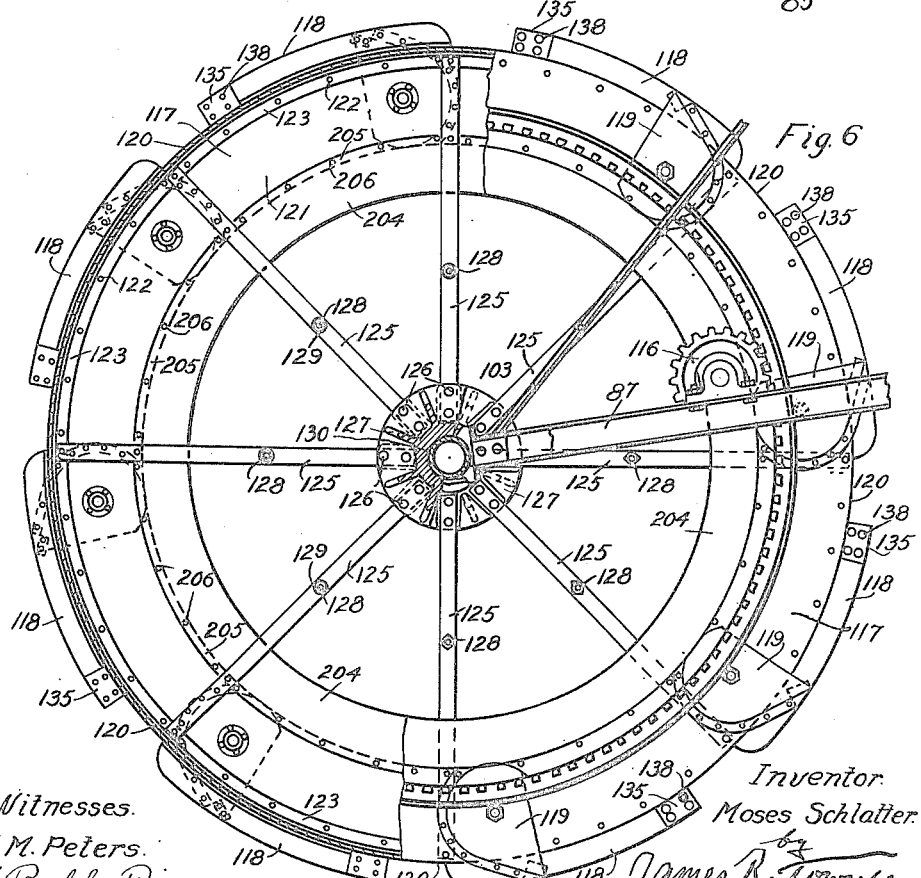
Fig. 6 is an enlarged side elevation of the cleaning or silt removing means shown in Fig. 5. The right-hand half of this figure shows in full the wheel, the dividers and the buckets comprising said silt removing means and the left-hand half of said figure shows an axial section through same.

In the detailed views of Figs. 5 and 6, said wheel 117 is seen to comprise a flat cylindrical rim or drum 120 to which are attached the flat annular sides 121. These sides are attached to the flat rim by rivets or other suitable means 122 passing through two angle-irons 123 and 124 running completely around and attached to the inner side of rim 120.

At their outer extremities the bent wheel spokes 125 are attached to the flat annular wheel sides 121 and at their other extremities are attached by rivets 126 to a webbed steel cast hub 127. These wheel spokes are mounted in pairs, each pair being bound together and reinforced by bolts 128, and being spaced apart by tubes 129 through which the bolts 128 pass. The steel hub 127 is provided with a central aperture 130 through which the wheel-supporting shaft 103 passes loosely and whereby the wheel and the silt-removing mechanism on same is rotatably mounted on the shaft 103.

This wheel, which is revolved by mechanism hereinafter described, operates to clean the silt from that portion of the ditch lying immediately beneath the flat rim 120 by means of the dividers 118, which are adapted to plow into and divide or part said silt and remove the same beyond either of the wheel sides 121. These dividers comprise two angle-iron sections 131 and 132 respectively, one leg of said angle-iron sections being fastened to the flat rim 120 by rivets 133, and the other leg 134 extending outward radially from the rim 120 and performing the silt dividing and removing function of the element. The angle-iron sections 131 and 132 are bent and cut in such manner as to form the forward piercing and dividing projection 135, the outwardly slanted faces 136 whereby the silt is propelled beyond the wheel sides, and the parallel trailing faces 137, the latter lying flush with the wheel sides 121. Counter-sunk rivets indicated at 138, Fig. 6, bind the forward piercing projections 135 together, thus securing the necessary rigidity to the divider sections.

It may sometimes be desirable to have access to the space between the flat rim 120 and sides 121, and to this end I provide at different points around rim 120 a series of hand holes 139, Fig. 5, the same being placed adjacent the dividers and between the sections 131 and 132 of same. The hand holes are closed by cover plates 140 which are fastened to the rim 120 by bolts 141.

The details of my novel telescoping silt removing and silt containing buckets 119 together with the mounting whereby the same are attached to the wheel sides, are best shown in Figs. 7, 8, 9 and 13, and will now be described.

The bucket bottom, Fig. 9, is seen to comprise two members, the former 142 of which has a cylindrical portion 143 and a straight portion 144 extending tangentially from said cylindrical portion, and the latter 145 of which is cylindrically shaped and movably mounted on the first said member 142.

At its inner side the member 142 is turned upward and outward so as to form the attaching flange 146 whereby the counter-sunk rivets 147 rigidly and stationarily attach said member to the wheel side 121 and to the divider face 137. In order to properly brace the straight forward scooping edge 148 of the bucket bottom a portion of flange 146 has been reversed to form a short flange 149 attached to the divider face 137 by rivets 150. With this mounting it is seen that the wheel side 121 and the divider face 137 constitute a stationary inner side for the bucket bottom member 142, and the outer side of said member is formed by a plate 151, Figs. 7 and 8, having the inwardly extending flange 152. The said flange embraces the bottom member 142 along its whole length and is secured thereto by rivets 153ª, Fig. 7. It will be understood from the foregoing that one member of the bucket comprises a bottom section 142, an outer side 151 and an inner side including the divider face 137 and the wheel side 121, and that this bucket member is rigidly and stationarily mounted on the wheel 117.

Within this stationary bucket member is movably mounted a second movable member including an inner and an outer side 153 and 154, Fig. 7, and the aforesaid cylindrical bottom member 145. These sides 153 and 154 have the shape shown in Fig. 9 and an edge of each is bent inwardly to form flanges 155 lying along and being attached by rivets 156, Fig. 7, to the cylindrical bottom member 145.

In order that the outer side 154 of said movable bucket member may be pivotally mounted on the outer side 151 of the stationary bucket member, the stub bolts 157, having nuts and washers 158 and 159, Fig. 7, respectively, are passed through said sides 151 and 154 of said members repectively.

In order that the inner side 153 of the said movable bucket member may be pivotally mounted upon the inner side of the stationary bucket member, means generally referred to as 160 is provided. This means has provision also for re-setting or reëxtending the movable bucket member to its normal position on the stationary bucket member after the former has loosened and detached the silt from the bucket as will be hereinafter described.

The general position within wheel 117 of means 160 is best illustrated in Fig. 5, and the details of said means is best illustrated in Figs. 7, 10 and 11.

In the latter figures the means 160 is seen to contain principally a central pin 161 having an enlarged cylindrical portion 162, a reduced square portion 163 and a further reduced threaded and cylindrical portion 164. The enlarged cylindrical portion 162 extends rotatably through and behind the wheel side 121 and is rotatively supported in the bearing casting 165, the latter being fastened to the wheel side 121 by rivets 166. The square portion 163 of pin 161 passes through a square aperture 167 in the inner side 153 of the movable bucket portion, said aperture 167 being adapted to fit snugly and non-rotatably onto the square pin portion 163. The nut 168 and washer 169 are fastened on the reduced cylindrical threaded portion 164 of the pin, and serve to securely bind the bucket side 153 against the pin shoulder 170.

It will be seen that the above-described portion of means 160 will serve to pivotally attach side 153 of the movable bucket member to the wheel side or stationary bucket side 121.

To insure the re-setting function whereby means 160 operates on the movable bucket member, a strong resilient spring means 171 is positioned on the cylindrical pin portion 162. One extremity of said spring is bent into a loop 172 embracing a bolt 173, the latter passing radially through the pin portion 162. By means of a washer 174 and nuts 175 carried on bolt 173, the same is adapted to fixedly bind loop 172 into position on the pin portion 162. The other extremity of the spring means 171 is bent into a straight horizontal portion 176 which may be sprung into any aperture 177, a series of which lie in the bearing casting 165. Obviously the tension of the resilient spring means 171 will depend upon the particular aperture 177, of the said series, into which the straight portion 176 is sprung. It will be clear also that the tension of said resilient spring means will operate through bolt 173 and will tend to turn pin 161 in a counter-clockwise direction as viewed in Fig. 10 or in a clockwise direction as indicated by arrow 178, Fig. 9. This tendency acts through the square pin portion 163 and the side 153 of the movable bucket member to reset or extend said movable member to its normal position shown in Figs. 7, 8 and 9 after the silt has been discharged from the bucket.

From the foregoing it is clear that the stub bolt 157 and the means 160 pivotally and rotatably support the movable bucket member on the stationary bucket member, and that the movable bucket member may be rotated in the direction of arrow 179, Fig. 9, from its normal position indicated in Figs. 7, 8 and 9 to its retracted or discharging position indicated in Fig. 9 by the dotted lines at 153ª and in Fig. 13 by full lines. In order to rotate the movable bottom member 145 a finger 180, Figs. 7 and 8, is provided adjacent the outer edge of same, and this finger 180 operates said member as the revolving wheel 117 carries the bucket to its upper or discharging position. At this rotative point the finger contacts with and slides on the track or cam 181, Figs. 1 and 13, the said track or cam being suitably mounted on a hopper 182 as will be later described.

Considered as in the train, the rigid cutting and scooping member is always on the outside of the path of travel and the circumferentially retractable cover member is always on the inside of the path. The members are concentrically curved and are concentrically telescoping, one swinging on the axis of both. At the time the load is received the retractable member forms the top or cover or back against which the load is piled, and at the point of discharge the retractable member forms the bottom and when it retracts the load falls inwardly from the path of the buckets.

The object of rotating the bucket member at the discharging position is first to loosen, detach or scrape the sticky silt from the bucket parts; and second, to withdraw the movable cylindrical bottom member from beneath the loosened silt, thereby aiding the discharge of same. The nature of this silt removing, detaching or scraping action will now be described.

The radius of the movable cylindrical bottom member 145 and the radius of the cylindrical portion 143 of the stationary bottom member 142, are so chosen that the former member rests and contacts slidably and rotatively on the latter. As the bucket containing its charge of silt reaches the discharging position, the movable member rotates on the stationary member and causes the forward edge 183 of the movable bottom 145 to detach and scrape or peel the silt off the cylindrical stationary bottom portion 143, and the motion of member 145 will shear beneath and prevent the sticky silt from becoming attached to this member. Just previous to this detaching action the revolution of the wheel has been turning the bucket till the movable member has become the chief supporting bottom for the silt. As the movable member is rotatively telescoped onto the cylindrical portion of the stationary member to loosen and scrape the silt off same, the chief support for the silt is obviously being withdrawn from same. Finally when the movable member is near its limiting position, the silt will have no bottom support and can stick or cling to the bucket only along the straight tangential bottom portion 144 which at this time will be facing downward as in Figs. 9 or 13. The means whereby the silt is now loosened, scraped and detached from this final sticking position on the straight tangential portion 144 will now be described.

Two keepers 184, Figs. 7 and 9, one for each side of the bucket, are secured by counter-sunk rivets 185 to the straight tangential bottom portion 144, thus providing a slot 186, Fig. 9, between said keeper and said straight bottom portion 144. Constrained in said slot and bearing upon the straight bottom portion 144 are the two beveled scraping blades 187, the same being secured to each other by two straps 188 and rivets 189, one strap lying beyond each keeper 184 and serving to embrace rigidly the corresponding ends of the blades 187. Both the forward and rearward edges of each said blade is beveled as in Fig. 9, and when the blades move on the straight bottom portion 144 the edges scrape and remove the silt from same. In order that the forward blade 187 may scrape the bottom portion 144 right to the straight forward scooping edge 148, the ends of said blade are cut away as at 190, Fig. 7, so as to permit them to slide past the forward attaching base 191 of the keepers 184. On the rear end of each strap 188 is riveted an upright finger 192 and by means of these fingers the scraping blades are moved on the stationary straight bottom portion in a manner now to be described.

Two blade-moving pins or projections 193 and 194, Fig. 9, are mounted respectively at a rearward and a forward point on each of the sides 153 and 154 of the movable bucket member. As the bucket reaches its discharging position and the said movable member is rotated by the track or cam 181, the pin 193 will in due course contact with the upright finger 192; and during the remainder of said rotation the finger and scraping blades will be moved by said pin from their full position, Fig. 9, to their dotted position 192' and 187' respectively. During this motion of the blades 187, the rear blade will detach and scrape the silt from the rear part of the straight tangential bottom portion 144, and the forward blade 187 will loosen and scrape the silt from the forward part of said bottom portion, thereby scraping the silt substantially from the whole straight bottom portion 144. In their forward limiting position the blade-moving pins are represented by dotted lines 193' and 194', Fig. 9, and when, at the end of the discharge, the bucket finger 180 passes off track 181 the re-setting means 160 will re-set, return or extend the movable bucket parts to their normal position shown full in Fig. 9. In the course of this re-setting the forward pin 194 will contact with the upright finger at 192' and during the remainder of said re-setting the pin 194 will return the finger and the scraping blades to their normal position, shown full at 192 and 187 respectively.

Directing attention again to Figs. 5 and 6 it is seen that two annular steel bands 195, one for each side of the silt removing means 21, pass around and are rigidly attached to the outer stationary sides 151 of each of the buckets. These annular bands serve the double function, first, of reinforcing and binding together the outer portions of the buckets; and second, of imparting rotary motion to the buckets 119 and the wheel 117 around the stationary shaft 103. This rotary motion is imparted to the band 195 in view of the internal gear 196 formed on its outer face by means of the outwardly projecting teeth 197. These teeth, on each of the gears, coöperate internally with the driving gears 116 on wheel hangers 85 and 86 previously described. It will be seen that the teeth 197 are free all around, except at one side where they are attached to the band 195. With gear teeth so attached any silt, weeds or other rubbish, which may lodge on the gears 196, will easily pass out between the teeth 197, especially when the teeth of gear 116 come into contact with same.

Viewed broadly now the whole silt-removing means 21, as above described, is seen to rotate about the shaft 103, power being imparted to same through gears 196. Those buckets positioned at the lower part of the wheel scoop into, clean, and remove the silt 8, Fig. 1, from the ditch, while those buckets positioned at the upper portion of the wheel discharge their silt into a hopper 182 to be later described.

From the lowermost bucket shown in Fig. 1 it is seen that by providing the stationary straight tangential bottom portion 144 the straight scooping edge 148 will be carried forward, so that the tangential bottom portion 144 and the cylindrical bottom portions 143 and 145 will not scrape along the silt surface cut during the upward course of the scooping edge 148. By this means all friction caused by rubbing against the silt is minimized.

By inspecting the portion 10 of the ditch behind the wheel—that is, the portion of the ditch which has just been cleaned, (see Figs. 1 and 2)—it is seen to be absolutely flat, straight and level both crosswise of the ditch and lengthwise of the ditch. This is especially noticeable by comparison with the original ditch bottom 7 as it appears ahead of the wheel. The flat and level ditch bottom is secured crosswise of the ditch by the coöperation of several elements as follows:—

As the wheel rotates the piercing point 135 of dividers 118, will pass into and divide the silt 8, and in an obvious manner the sloping sides 136 of said dividers will propel this silt sidewise toward either side of the wheel, and thus remove said silt from beneath the rims 120 to a depth equal to the upright divider legs 134. The silt so displaced, and the silt normally lying in the path of the buckets, will all be scooped into the buckets by the straight scooping edge 148 of same. It will be noticed that a bucket is placed adjacent each side of each divider and that the straight scooping edge 148 of said bucket lies at the intersection of the outer edge of divider faces 136 and 137. By this position of said parts the radial distance from the straight scooping edge 148 to the axis of shaft 103, is equal to the extreme radial distance from the outer edge of the divider to the same shaft axis. With this construction, obviously the ditch bottom 10 is cleaned, by the dividers, to the same depth beneath the wheel rim, as the buckets clean said ditch bottom on either side of said wheel rim, whereby the whole cleaning means 21 may be said in general to form the new ditch bottom into a straight transverse bottom line 10, Fig. 2, lying across the ditch.

The silt removing means 21 runs immediately behind the forming knives 43 and 44, so that the buckets 119 will scoop the silt cut by the knives while said silt is rolling inward under the influence of the knife deflecting portions 51. By this proximity of the buckets to the knives, the tendency of the silt to roll or fall back against the clean sides of the ditch is intercepted and prevented.

The buckets rotating upward and forward as indicated by arrow 198, Fig. 1, may raise a small quantity of water along with the silt. As the buckets move upward on the wheel, however, they obviously tilt gradually so that said water may spill back into the ditch over the rear bucket edge 199, Fig. 9. As a result of this tilting action also the movable cylindrical member 145 becomes the true bottom of the bucket; and finally, when the track or cam 181 is reached this movable true bottom member will be withdrawn from beneath the silt, and will simultaneously loosen, detach and scrape the silt from itself and the stationary bottom member 142. These two positive effects acting simultaneously, serve to expel and discharge the silt from the bucket, a hopper 182, as previously described, being provided to receive the discharged silt and to conduct same onto the conveying means 22 as will be hereinafter described.

It will be noticed finally from the direction in which wheel 117 rotates, that any silt which may slobber over the buckets will fall onto the forward or uncleaned portion of the ditch and will leave the rear or cleaned and formed bottom 10 in perfect condition.

Now, directing attention to the silt after same is discharged from the buckets, it is seen to pass through the hoppers 182, one of these being located on each side of the silt-removing means 21, Figs. 12 and 13. Each hopper essentially comprises the sloping sides 200, having lower vertical portions 201 extending into a portion of the silt conveying means 22, and said hopper also includes the rear baffle plate 202 suitably attached to the sides 200 by means of rivets 203, Fig. 12. These hoppers are stationarily mounted with respect to shaft 103 and rotatable inclined aprons 204, one on each side of the wheel 117, are attached to the wheel sides 121 and coöperate with said hoppers to conduct silt discharged from the buckets. Each apron 204 is frusto-conical in shape and is formed with a flared edge 205, Fig. 6, whereby the apron is attached by rivets 206 to the inner face of the wheel side 121. Said apron is located between the buckets and extends over baffle-plate 202, Fig. 12, thus serving to deflect the silt outward from the wheel to a position where it may be conveniently received by the conveying means 22. The baffle plate 202 baffles, toward the conveying means 22, all the silt falling off apron 204 and thus prevents the slobbering of spokes, hub, and other wheel parts.

The inner ends 207, Fig. 12, of the sloping hopper sides 200, are cut along an upwardly sloping edge 208 adapted to lie and scrape upon the rotating apron 204, thereby positively removing, into the hopper, any silt which may be sticking to the apron. At its terminals 209 and 210, Fig. 13, respectively, the track or cam 181 is seen to be attached to the outer end of the hopper by means of rivets 211, and the limits between the terminals of this track mark the limits between which buckets 119 may discharge their silt. As the finger 180 contacts with the forward cam terminal 210 the movable cylindrical bucket member rotates into its withdrawn or discharging position Fig. 13, and when said finger 180 moves off the cam end 209, the bucket resetting means 160 will reset or extend the movable bucket member to its normal position.

In order to support the hopper 182 the same is attached along its sloping sides 200 by rivets 212, Fig. 12, to two uprights 213 and 214. At its lower extremity, upright 213 carries heavy boxes comprising the usual sections 215 and 216 surrounding and rigidly binding the shaft 103 by means of the U-bolt 217 having nuts 218. The upright 214 is provided at its lower end with a lighter box 219 which also binds shaft 103 rigidly by means of the U-bolts 220 and nuts 221 on same. By setting the nuts 218 and 221 hard, the uprights and the hopper will be stationarily supported with respect to shaft 103, but to maintain this support more securely, a brace indicated at 222, Fig. 13, may be attached between the upright 214 and any convenient point on wheel hangers 85 and 86, the latter conventional attachment, however, being omitted from the drawings.

The details of the conveying means or conveyers 22, one of which is located on either side of wheel 117, may be best seen in Figs. 14, 15, 16 and 17. The base or trough of said conveying means comprises the two side channels 223, Fig. 16, each having inwardly extending plates 224 attached to the lower face of same, and across the upper face of these plates is attached the sectional bottom 225, Fig. 14. In order to extend the sides of said trough upward, an upright plate 226 is attached to the inner faces of each channel 223, and at the receiving end of said conveyer these plates are flared as at 227, Fig. 15, and are adapted to lap over and coöperate with the lower hopper portions 201.

Through the vertical hopper portions 201 the silt tumbles onto the receiving end of the conveyer bottom 225, and by means of the endless chains 228, carrying the cross slats or angle-iron sections 229, the silt is pushed along the sectional bottom and discharged at the normal discharging end 230. For purposes hereinafter referred to, the actual discharging point of the conveyer may be varied from extremity 230, by merely removing one or more of the section plates 231 in the sectional bottom 225.

Each of the removable section plates 231, Fig. 17, is provided with apertures 232 and 235 along its side and front edges respectively. To the lower face and along the rear or trailing edge of said section plate is also welded or otherwise secured, a straight attaching flange 233 provided with screw-threaded apertures 234.

These removable section plates are placed across the inwardly extending plates 224, the forward edge of one plate lying onto the flanged attaching plate 233 of the next. By screws or bolts 236, or any other means which may be easily withdrawn and reset to position, the removable section plates 231 are attached through the side apertures 232 to the inwardly extending plates 224, and are attached through the forward apertures 235 to the rear flange plate 233 of the next succeeding section plate. By this construction a perfectly flat rigid sectional bottom 225, is obtained and the sections of same may be rapidly and conveniently removed.

Starting from the normal discharging point 230 of the conveying means 22, and removing one or more sectional bottom plates 231, the silt discharging point is advanced toward the hopper 201, and by removing a suitable number of section plates the silt may be discharged onto or at different distances from the ditch banks. The utility of this feature will be hereinafter referred to.

The endless chains 228 are trained about and are adapted to be operated by two sprocket wheels 237, Fig. 14, these wheels being rigidly mounted on a shaft 238 near the normal discharging end of the conveyers. After passing over said sprocket wheels the lower strands of chains 228 are trained over the idlers 239, and around two sprocket wheels 240, the latter being loosely mounted on a tubular shaft 241 at the receiving end of said conveyer. The elevation of the sprocket wheels 237 and 240 above the conveying bottom 225 is so chosen that the upper strands of chains 228 glide along the conveyer bottom 225. The horizontal legs of the angular slats 229 are attached across the chains 228, and in an obvious manner therefore, the vertical leg of said slats will scrape and propel the silt along and off the flat conveyer bottom 225.

For the purpose of driving the chains 228 and the conveying slats 229, a driving sprocket 242 is rigidly attached to the rotatable shaft 238, and a suitable power transmitting chain 243, Figs. 14 and 15, is trained around said sprocket 242 and around a similar sprocket 244, the latter being rotatably mounted on one side of the conveyer. The sprocket 244 is integrally constructed with a bevel gear 245, which meshes with a similar bevel gear 246, the latter also being integrally constructed with a sprocket wheel 247. The last said bevel gear and sprocket wheel, are suitably mounted in a frame 248 which is attached at 249 to one side of the conveyer.

As is indicated in Figs. 3 and 26 the sprocket 247 is connected by a power transmitting chain 250 to the power-driven sprocket 115 on the wheel hanger 85 or 86, and from this sprocket 115 power is transmitted, in an obvious manner, through the foregoing sprockets to the chains 228 and conveying slats 229.

The conveyers 22 described above are mounted beneath the hoppers 182 respectively, one point of support for each conveyer comprising a through bolt 252 projecting through aperture 253 of the hopper upright 213, Fig. 12, the through bolts extending through and pivotally supporting the shafts 241 and being provided with nuts 251 to secure the bolts in place. The U-bolts 254, attached centrally by nuts 255, to the channels 223, constitute the second means of support whereby the conveyer 22 is suspended from the vehicle.

The relative position maintained between the conveying means 22 and the silt-removing means 21 is illustrated in Fig. 2, and a further detailed description of the conveyer mounting will be temporarily suspended in order to describe the novel operation of my silt-conveying means 22.

In Fig. 2, the sections 18 represent built-up additions to the ditch banks 4 and 5, the said additions being produced by discharging at the normal conveyer extremity 230, the silt removed from the ditch. When it is desired, however, to build up either or both ditch banks along their crests, or build up the sections 17 on the inner sides of the banks, it is merely necessary to remove a number of section plates 231 whereby the discharging point is brought inward on the conveyer bottom and will be positioned at the outer extremity of the last remaining section plate. By this construction it is possible to build up the ditch banks in either or both directions, and this feature becomes quite important when leakage of the water from within the ditch must be arrested by thickening ditch bank. As will be hereinafter described the rearward and forward supporting wheels 35 and 41 are extensible, i. e., transversely adjustable on the vehicle; and by suitably positioning said wheels the upbuilt ditch bank portions 17 and 18 may be rolled hard and flat on successive traverses of the cleaner, and may be welded into unitary and permanent additions to said original ditch banks.

Attention will now be redirected to the conveyer mounting means coöperating with the U-bolts 254 whereby the conveyer is suspended at its center.

The details of the two similar triangular conveyer hangers 256 and 257, one for each conveyer respectively, are shown in Figs. 27 and 28, and the general location of said hangers is shown in Fig. 3.

At one apex of each of these triangular conveyer hangers the horizontal bar 258 and the upright bar 259 are attached to the box 260 having the usual sections 261 and 262, which sections are bound loosely onto the transverse vehicle shaft 34 by means of the U-bolts 263 and nuts 264. At this apex the hanger is pivotally mounted on the transverse vehicle shaft 34, and permits rotation on same. Longitudinal motion of the hanger along the shaft, is arrested by the two collars 265, rigidly attached by set screws 266 to shaft 34 on either side of the hanger box.

At another apex of these triangular conveyer hangers the horizontal bar 258 and the oblique bar 267 are attached by nuts 268 to a depending projection 269 where the bail 270 is pivotally carried by means of pin 271. The said bail has two arms 272 terminating in the upwardly curved fingers 273. It is by means of these fingers which pass through and beneath the U-bolts 254 on the conveyer 22, that the outer or discharge end of said conveyer is suspended in elevated position— see Fig. 2.

At the third apex of these triangular conveyer hangers the upright bar 259 and the oblique bar 267 are connected by means of bolts 274 to the projection 275 carrying the rotatable pulley 276 on the pin 277. The cables 278 and 279, one for each of the hangers and operated in a manner hereinafter described, pass around the pulleys 276 and serve to rotate the hangers about their pivotal mounting on shaft 34, and thus raise or lower the conveyers 22.

From the foregoing description of the conveyer mounting taken together with the description of the mounting for the silt removing means 21, it is seen that the whole is pivotally supported on the transverse shaft 34 and that by means of the wheel hangers 85 and 86 and the conveyer hangers 256 and 257, the said silt-removing means and said conveying means may be bodily raised or lowered by operating cables 106, 107 and cables 278 and 279. As will be presently described these cables are all operated simultaneously so that the upward or downward adjustment of the silt removing means 21 and the conveyer means 22 will be simultaneously effected without disturbing the relative position of said means.

When the ditch cleaner and former is traveling cross country or crossing bridges, etc., the foregoing vertical adjustment is necessary in order to permit the silt-removing means 21 to be elevated above the land surface, and when the vehicle is traveling along ditch banks similar to those shown on the right, Fig. 1, where the altitude variations are considerable, the foregoing vertical adjustment of the silt-removing means is necessary in order that the ditch bottom may be cleaned and formed along a perfectly straight level line 10.

The means whereby the adjusting cables 106, 107 and 278, 279 are operated is best seen in Fig. 3 and will now be described.

For each of the cables a winding drum 280, 281, 282 and 283 respectively, is rigidly provided on the power-driven shaft 77, these cables being wound around said drums and having one extremity attached to same. The other extremities of said cables, after passing around the hanger pulleys 105 and 276, are attached to separate adjustable turn buckles 284, Fig. 1, the same being anchored to the main frame 23 as at 285.

The shaft 77 is indirectly driven by a gasolene or other suitable motor attached to the main frame 23 and conventionally shown at 286, Figs. 1 and 3. The fuel-supply, cooling tank, and the other usual accessories for such motors, may be attached to any suitable part of the vehicle frame, but these have been omitted from the drawings for purposes of clearness. From the engine shaft 287 power is transmitted through a main friction clutch 288, having an operating handle 289 to a pinion 290, the clutch handle 289 being thrown at this time, and from said pinion, which meshes with a gear 291, the engine power is transmitted to the shaft 292, which is rotatably mounted in bearings 293 on the main frame 23. The double throw friction clutch 294, having an operating handle 295, is mounted on one end of shaft 292 and through reversing means generally referred to as 296, said clutch is adapted to transmit power to the shaft 77, to effect the rotation of same in either direction.

The details of the reversing means 296 are illustrated in Figs. 23 and 24 and will now be described.

Two sprocket wheels 297 and 298 are loosely carried by shaft 292 on either side of the double throw friction clutch 294, and by throwing the operating clutch handle 295 toward either of said sprocket wheels, the same may be put into rotative engagement with the shaft 292. From each of the sprocket wheels 297 and 298 the power-transmitting chains 299 and 300, respectively, are trained about the sprocket wheels 301 and 302, the last said sprocket wheels, being unitarily constructed with the bevel gears 303 and 304 respectively, and being mounted by means of stub bearings 305 and 306 onto the brace 32 and channel 27 of the main frame 23. Between the bevel gears 303 and 304 rises a vertical shaft 307 rotatably supported in the bearing standard 308, Fig. 24, and at its lower extremity said shaft carries a bevel gear 309 adapted to mesh with the aforesaid bevel gears 303 and 304. Above the bevel gear 309 the shaft 307 also carries a worm 310 adapted to mesh with the worm wheel 311 which is rigidly attached to the shaft 77, and which completes the chain of reversing mechanism referred to as 296.

When the operating handle 295 is thrown toward the sprocket wheel 297 so as to rotatively engage same to shaft 292 power will be transmitted through chain 299, sprocket 301, beveled gear 303, beveled gear 309, worm 310 and worm wheel 311 to the shaft 77, and the drum and cables thereon, thus causing said shaft to rotate in one direction to effect the upward adjustment of the silt-removing and silt-conveying means 21 and 22, respectively. When the operating handle 295, however, is thrown toward the sprocket wheel 298 power will be transmitted from the shaft 292 through a similar chain of mechanism to the shaft 77, and will rotate same oppositely and effect a downward adjustment of the silt-removing and silt-conveying means 21 and 22 respectively.

Sometimes it may be desired to adjust the silt-removing and silt-conveying means 21 and 22 respectively, without using power, and to this end a hand-wheel 312 is provided on the upper end of the upright shaft 307. By rotating this hand-wheel a turning effort will be transmitted through the worm 310 and worm wheel 311 to shaft 77, thereby effecting a simultaneous winding of the cables 106, 107, 278 and 279 on their respective winding drums, and thereby securing the simultaneous vertical adjustment of the silt-removing and silt-conveying means 21 and 22 respectively. The foregoing operation of the hand-wheel 312 and shaft 307 does not interfere with the reversing or power-transmitting mechanism 296, because the sprocket wheels 297 and 298 both turn loosely about shaft 297, when the double throw clutch 294 stands neutral.

In the course of ordinary operation however an attendant stands near the operating handle 295 and when the vehicle travels over ditch banks having a rough and uneven contour as represented at the right in Fig. 1, the attendant will throw handle 295 toward sprocket 297 or 298 according as it is necessary to raise or lower the silt-removing means 21. If the attendant exercises ordinary skill in the foregoing a perfect flat horizontal and level re-formed ditch bottom 10 may be formed behind the advancing vehicle without regard to altitude variations in the ditch contours. In order to so counteract the high and low parts in the ditch banks both the upward and downward adjustment of means 21 and 22 must obviously be effected with despatch; and for this reason power is applied to effect the downward adjustment as well as upward adjustment of said means.

Due to the weight of the silt removing and silt-conveying means 21 and 22 respectively, and to jarring of the whole, the cleaner shaft 77 may slowly rotate and unwind the adjusting cables, and thereby inadvertently permit the silt-removing means 21 to sink into and cut the ditch bottom 10 abnormally deep.

To prevent this a ratchet 313, Figs. 23 and 24, may be mounted on shaft 77, and said ratchet coöperates in the ordinary manner with a pawl 314 mounted on brace 32 by means of a standard 315. Before shaft 77 can be unwound to lower means 21 and 22, the pawl 314 must be kicked or otherwise removed off ratchet 313. To expedite this a chain or cord, not shown in the figures, may be attached to the pawl and led to the clutch-operating handle 295, whereby the withdrawal of the pawl may be conveniently effected by the attendant who is operating clutch handle 295.

Directing attention now to the means whereby power is delivered to the sprocket wheels 114 on each of the wheel hangers 85 and 86, it is seen, Fig. 3, that a power-transmitting chain 316 is trained around each of the sprockets 114 and around sprockets 317, the latter being rigidly mounted on a shaft 318 carried in bearings 319 below the main frame 23. Another sprocket 320 is also rigidly mounted on shaft 318 and a power-transmitting chain 321 trained around said sprocket 320 and also around the sprocket 322, the latter being loosely mounted on shaft 292. Coöperating with last said sprocket 322, and for the purpose of rotatively binding same onto shaft 292, a clutch 323 having an operating handle 324 is also provided on the shaft 292.

When the main power clutch and handle 288 and 289 are thrown, and the clutch and handle 323 and 324 are thrown power will be transmitted in an obvious manner to shaft 318, to sprockets 317, to sprockets 114 on the hanger arm, and from thence the power will be distributed as hereinbefore described to bevel gears 247 and 244 for driving the conveying means 22 and onto the gears 116 for driving the silt removing means 21.

It will be seen from the foregoing that the turning effort for the silt-removing and silt-conveying means is applied on both sides of the vehicle, thus adequately balancing said turning effort and producing no objectionable side thrusts on said means or on the vehicle to which it is attached.

It will be seen also from the foregoing that clutch handles 295 and 324 are operated independently so that the vertical adjustment of the silt-removing and silt-conveying means 21 and 22 respectively, may be effected while said means is either operating or resting according to the wish of the operator.

Now, directing attention to the means whereby the vehicle is adapted to travel along the ditch it is seen, Fig. 3, that a pinion 325 is loosely mounted on shaft 292, and that a clutch 326, having an operating handle 327, is also mounted on said shaft for the purpose of rotatively binding pinion 325 to the shaft. Pinion 325 meshes with a gear 328 rigidly mounted on a shaft 329 the latter being carried in bearings 330 on the main frame 23. On said shaft 329 are also mounted the pinion 331 and a double gear comprising gear parts 332 and 333, the said pinion and double gear being free to move axially along said shaft, but being rotatively engaged with said shaft by means of a key 334. Shifting clutches 335 and 336 conventionally shown in Fig. 3, are provided for shifting said pinion and double gear respectively. On a shaft 337 carried in bearings 338 on the main frame 23 are rigidly mounted the gears 339, 340 and 341 adapted to mesh with the gear parts 333, 332 and pinion 331 respectively when the latter are properly thrown by their shifting clutches; and on the inner end of said shaft 337 is also carried a pinion 342. On a shaft 343 carried in bearings 344 and 345 on the main frame 23, is a large winding drum 346 of ordinary construction. One end of this drum, Fig. 3, is broken away to show its integral internal gear 347 meshing with and being driven by the pinion 342. Wound around this drum 346 and attached to same at one extremity is a heavy traction cable 348 and the other extremity of said cable, after passing through guides hereinafter described, is securely fastened to a heavy pile driven into the ditch a considerable distance ahead of the vehicle. This pile is not shown in the figures.

The cable guide just referred to is located on the forward projection 38 of the main frame 23 and comprises above, the cross member 36, Fig. 4, and below the roller 349 carried in bearings 350 beneath the longitudinal channels 25 and 26. On its sides said guide comprises the rollers 351 and 352 suitably carried between the cross members 36 and 37. The traction cable 348 passes between the parts just referred to.

When the vehicle is to be started along the ditch, the operator throws either shifting clutch 335 or 336 so as to engage the pinion 331 or the double gear 332 or 333 with the respective gear 341, 340 or 339. If the main power clutch is already thrown he next operates clutch handle 327 and in an obvious manner the pinion 342 will thereby rotate, and transmit the engine power to the winding drum 346. Cable 348 will wind onto the rotating drum 346 and through the reaction of the pile to which the forward extremity of said cable is tied, the vehicle will move forward toward the pile. From the respective diameters of the pinions 331, gear parts 332 and 333, and the corresponding gears 341, 340, and 339, it is seen that the vehicle will move along the ditch with either of three different speeds, the engine speed remaining constant. This feature admits rapid or slow traverses along the ditch when there is respectively little or much silt to be removed and cleaned out of the ditch.

When the vehicle is traveling across country, however, neither of the three foregoing speeds is sufficiently rapid, and to provide a suitable traveling speed for such occasions, a sprocket wheel 353 is rigidly mounted on shaft 292 and another sprocket wheel 354 is rigidly mounted on shaft 337. When the vehicle is ready to travel rapidly across the country the operator trains a removable power transmitting chain 355 around the sprockets 353 and 354, and shifting clutches 335 and 336 at this time being set to unmesh their respective pinions and gears from the gears on shaft 337, clutch 326 may be thrown and the vehicle will speed across the intervening fields in an obvious manner. The vehicle in traveling across country is moved by means of the traction cable 348 and pile as previously referred to.

Now directing attention to the forward truck 40, the details and mounting of which are best illustrated in Figs. 3, 4, 19, 20, 21 and 22, the same is seen to comprise chiefly a truck frame including a forward and a rearward transverse channel 356 and 357, Fig. 19, to the inner sides of which are adjustably attached smaller channels 358 and 359, bound together and braced at their outer ends by the cross channel 360. To the upper sides and at the center of the transverse channels 356 and 357, are attached two bearings 361 rigidly carrying the shaft 362. Said bearings and shaft comprise a part of the pivotal means 39, Fig. 4, previously referred to, whereby truck 40 is attached to projection 38 of the main vehicle frame 23; and the other part of said pivotal means 39 comprises bearings 363, Figs. 3 and 21, carried on the lower side of the main frame projection 38, these last said bearings embracing the projecting extremities 364, Fig. 19, of shaft 362. By this mounting it is clear that the forward truck frame will always be maintained perpendicular to the length of the main frame, and will be capable of pivotal motion about a horizontal axis through shaft 362, said axis running parallel to the length of said main frame. The object of this pivotal connection between the main vehicle frame and its forward truck is, to permit the rear supporting wheels 35 and the forward truck wheels 41 to always rest on the ditch banks so as to provide adequate support for the vehicle whether the supporting points for said wheels lie in a single plane or not.

By this pivotal mounting also all the said wheels will readily and automatically accommodate themselves to the uneven ditch bank contours illustrated to the right in Fig. 1, and neither wheel will withdraw its supporting function from the vehicle.

The dirigible truck wheels 41 are rotatably attached to and between the channels 358 and 359 by means which will now be described.

The similarly mounted and constructed truck wheels 41 are rigidly attached to a shaft 365, the ends of which are carried in two bearings 366, Figs. 19 and 21. These bearings are attached by bolts 367 to the lower faces of two angle-irons 368. Each end of these angle-irons in turn is riveted to a gusset plate 369, which is attached by rivets 370, through a spacing plate 371, to the circularly bent angle-iron 372, Figs. 19 and 22. The lower leg 373 of the circular angle-iron 372 lies in a horizontal plane and is attached to and runs completely around the truck wheel 41. Another similar but slightly smaller circular angle-iron 374, Fig. 22, lies within the first said circular angle-iron 372 and is attached rigidly by rivets 375 to the channels 358 and 359 of the truck frame. At suitable intervals depending angular clips 376, Figs. 22 and 19, are attached by rivets 377 to the upper horizontal leg 378 of the circular angle-iron 374. Between the vertical depending leg 379, of each angular clip 376, and the depending leg 380 of the circular angle-iron 374, is carried an antifriction roller 381 revolving on a pin 382. The circular angle-iron 380 being a unitary part of the truck frame, the said frame will obviously be supported through the antifriction rollers 381, on the circular angle section 372 which is in turn supported on and connected to the supporting wheels 41 as described.

Due to the relative position of the circular angle-irons 374 and 372 it is seen that wheel 41 may be continuously rotated around a vertical axis 383 passing through its geometrical center, and the legs of said circular angle-irons will serve as mutual guides to retain each other in suitable relative position. The antifriction rollers 381 will reduce the friction of the aforesaid wheel rotation.

In order to prevent the wheel and its circular angle-iron 372, falling away from the truck frame and the angle-iron 374, angular clips 384, Fig. 22, are attached at different points around the vertical leg 380 of the circular angle-iron 374; and the lower leg 385 of clips 384 extends inward beneath the lower horizontal leg 373 to support the circular angle-iron 372. Should the truck wheel 41 be unsupported at any time the circular angle-iron 372 will rest upon legs 385 of the angular clips 384 and will thus be prevented from falling away from the circular angle-irons 374 and truck frame 359. The connection between the truck channels 358, 359 and the truck wheel 41 is thereby made complete and self-sustaining; and in order to permit legs 385 of angular clips 384 to pass over the horizontal leg of the angle-irons 368, the same are displaced from the horizontal leg 373 of the circular angle-iron 372 by means of the spacing plate 371. This forms a slot 386 through which the horizontal leg 385 of the angular clips 384 may pass over the angle-irons 368 and thus permit the indefinite rotation of the supporting wheel 41 around the vertical axis 383.

In order to steer the supporting wheel 41 the same is rotated around its vertical axis 383 by means of a segmental worm gear 387 rigidly mounted upon the circular angle-iron 372. This segment includes about 190 degrees of circular measure and is adapted to positively rotate the wheel through 180 degrees about its axis 383. The means coöperating with said segment for so rotating said wheel will now be described.

A hand-operated steering wheel 388 is mounted on an inclined shaft 389, the latter being carried in a main bearing 390 and in a supporting bearing 391, the latter being secured to braces 392. At the lower end of shaft 389 is attached a bevel gear 393 meshing with a similar bevel gear 394 on a hollow pipe shaft 395, the latter being rotatively mounted on the truck frame by means of bearings 396.

To make this steering means adjustable, for reasons hereinafter described, each extremity of the pipe shaft 395 is provided with a cap 397 rigidly secured thereto, and through the flat circular face of this cap passes a square central aperture indicated at 398, Figs. 19, 20 and 21. In the latter figure, portions of the steering mechanism have been removed for the purpose of revealing the said square aperture. The square shafts 399, one for each extremity of the pipe shaft 395, are adapted to slide through and fit snugly in the square apertures 398; and are rigidly but adjustably secured to the cap 397 and thus to the pipe shaft 395, by means of a set screw 400. The outer extremity of the square shaft 399 is formed with a cylindrical portion 401 which is rotatably supported in two bearings 402 between which bearings said shaft carries a worm 403 meshing with the aforesaid worm gear 387.

To steer the vehicle by the foregoing means, an operator manipulates hand wheel 388 so as to rotate shaft 395, worm 403, and worm wheel 387. The worm wheel 387 being connected to the truck wheel 41 will cause the latter to rotate about its vertical axis 383, and thus effect the steering referred to. It is understood, of course, that each of the supporting truck wheels 41 are similarly mounted and attached to the foregoing steering means, so that both truck wheels 41 will respond simultaneously and equally to any rotation of the steering wheel 388.

As will be understood from the foregoing, each truck wheel 41 is capable of an indefinite rotation about axis 383, but of this the positive rotative influence of the hand wheel 388 extends only over 180° practically. When it is desired to withdraw the vehicle from the ditch a heavy plank is laid across the ditch banks adjacent the truck wheels 41, and by rotating the face of same 90 degrees into a position parallel with the truck channels 358 and 359, the truck of said vehicle may be run directly across the plank till both truck wheels 41 are on the same side of the ditch. By suitably placing a plank beneath the rear supporting wheels 35 the remainder of the vehicle may be run across the ditch and the whole device is ready to travel across country. To facilitate this and other operations it is necessary that the truck wheels 41 be dirigibly mounted in some manner as aforesaid.

The means whereby the rear supporting wheels 35 and the truck wheels 41 are adjustable transversely of the vehicle will now be described.

Each of the rear wheels 35 are similarly mounted and one of said wheels is shown in section, Fig. 3. It will be seen in this section that said wheels are provided with the usual spokes 404 and hub 405, the latter being rotatively mounted on the shaft 34. Two adjustable collars 406 are mounted on shaft 34, one on either side of the hub 405, and may be rigidly secured to said shaft by means of the set screws 407. To adjust said wheels 35 transversely of the vehicle, i. e. longitudinally along the shaft 34, the collars 406 are set so as to maintain the wheel 35 between them and in its desired position.

It is seen in Fig. 20 that the channels 358 and 359 may be adjusted or extended from the channels 356 and 357 by shifting each of the bolts 408 passing through corresponding apertures in said channels. When it is desired to adjust truck wheels 41 transversely of the vehicle, the bolts 408 are removed and channels 358 and 359 are slid either into or out from the channels 356 and 357, till the apertures in said channels find a new and suitable alinement through which the attaching bolts 408 may rebind the channels to each other in their new and adjusted position. The wheels 41 being indirectly secured to and carried by channels 358 and 359, the said wheels will obviously approach or recede from each other in the course of the foregoing operation, and thereby the aforesaid transverse adjustment of the truck wheels will be effected.

By means of these adjustments of the truck wheels 41 and the rear wheels 35, the weight of the whole ditch cleaner and former may be brought onto different portions of the built-up ditch bank additions 17 and 18, Fig. 2, so as to roll same hard and flat and to weld same into an integral part of the original ditch bank 4 or 5. Also with the foregoing wheel adjustment, the vehicle can travel along any ditch having the bottom width for which its forming and cleaning means are adapted, and this will be possible altogether regardless of the varying distances between the ditch bank crests.

The distance between the crests of the ditch banks being completely unstandardized, the foregoing wheel adjusting feature becomes absolutely essential to the successful operation of a ditch cleaner and former.

It is believed that in the light of the whole foregoing detailed description, the operation of the whole and of every part of the device embodying my invention will now be clear. The several combinations and subcombinations have been illustrated whereby silt of any grade or character may be removed from a ditch while said ditch is being simultaneously formed with a flat straight and level ditch bottom, and with steep inwardly inclined sides, the planes of which lie absolutely parallel with the ditch length, and while the ditch banks are being built-up and rolled at any desired part of same; all of the foregoing operations combining to reform the inherently defective original ditch shape, and to produce an efficient water-carrying conduit of substantial capacity.

It will also be apparent from the foregoing detailed description that my cleaner and former is built and driven symmetrically with respect to a central line passing longitudinally through same, whereby the heavy rotative parts are perfectly balanced and whereby the weight is equally distributed onto the ditch banks and transmitted to same by pure vertical forces. In the larger units of my device, it may be necessary to brace or reinforce the uprights of the two wheel hangers 85 and 86, and of the two conveyer hangers 256 and 257, and for this purpose links 409 and 410, Fig. 2, may be suitably mounted between the same.

In substitution for the forming knives 43 and 44, I contemplate using sometimes the modified means shown in Figs. 29 and 30, and said modified means will now be described.

It comprises essentially two circular convex or saucer shaped forming blades 411 and 412, rotatably mounted beneath the cross beam 30 by means of a frame 413. This frame 413 comprises depending angle sections 414 pivotally secured between clips 415, the said clips being adjustably attached by bolts 416 to any of the series of apertures 73, previously described. The lower extremity of each depending angle section 414 is provided with a series of apertures 417, and a similar series of apertures is provided in an angle section 418, whereby the latter is adapted to be adjustably secured to the angle section 414 by means of bolts 419. The lower extremities of the angle sections are braced and bound together by a cross bar comprising the two angle sections 420 and 421. Sections 420 and 421 are attached at their outer ends to the sections 418 by means of bolts 422, and at their inner ends sections 420 and 421 are provided with a series of equally spaced adjusting apertures 423. By means of the last said apertures, through certain of which pass bolts 424, the inner ends of sections 420 and 421 are adjustably fastened to each other. The diagonally extending angle sections 425 and 426 are pivotally carried at one end on the bolts 422 and are provided at the other ends with a series of adjusting apertures 427. Coöperating with the last series is another series of adjusting apertures 428 provided in the angle sections 418, and by means of bolts 429 the upper ends of angle sections 425 and 426 are adjustably secured to sections 418. On the lower ends of sections 425 and 426 are carried the adjustable arms 430 and 431, the bolts 432 pivotally attaching said arms to their corresponding sections. At one extremity the arms 430 and 431 are provided with a series of adjusting apertures 433, Fig. 30, and through one of these passes a bolt 434 whereby said arms are rigidly positioned on angle sections 425 and 426. At the other extremity the arms 430 and 431 are each provided with a stub shaft 435 and on these stub shafts are rotatably carried the round or saucer shaped forming blades 411 and 412. The cables 74, previously described in connection with the forming knives 43 and 44, are attached to the horizontal sections 420 and 421 by suitable means 436, and will serve to pivotally raise from the ditch the circular blades 411 and 412. The action of these cables is similar to that described in connection with the forming knives 43 and 44.

During the cutting or forming operation the said cables will maintain the pivotal frame 413 in a substantially vertical position, so as to force the forming blades 411 and 412 into contact with the sides of the ditch bank, and as the vehicle travels along, the knives 411 and 412 will turn due to the rotative reaction of the silt which said knives are cutting.

It will be seen in Fig. 30 that the stub shafts 435 are bent rearwardly and since said shafts are also attached to the inclined angle sections 425 and 426, the circular forming blades 411 and 412 will obviously be inclined downwardly and inwardly and also rearwardly and inwardly. This double inclination will effect the cutting of the ditch banks along the desired steep inclined plane, and will also serve to deflect the cut silt inwardly toward the adjacent silt removing means.

The vertical distance beneath the vehicle at which the circular forming blades 411 and 412 rotate is adjusted by passing bolts 419 through different apertures of the series 417. The horizontal distance between the circular forming blades 411 and 412 is adjusted by passing bolts 424 through different apertures of the series 423, and by mounting the clips 415 and bolts 416, through the corresponding apertures of series 73. The downward and inward inclination of the forming blades 411 and 412 is adjusted by pivotally rotating the angle sections 425 and 426 around bolts 422, and by passing bolts 429 through the suitable apertures of series 427 and 428. The rearward and inward inclination of the forming blades 411 and 412 is adjusted by pivoting arms 430 and 431 around bolts 432, the securing bolts 434 being passed through the suitable apertures of the series 433.

It is thought that, in the light of the foregoing detail description, the mode of operation and the several adjustments of my modified forming means will be clear.

It will also be understood that in the practice of my invention, I do not intend limiting myself to either of the specific forming means described above, nor do I intend limiting myself specifically to any of the other means described above, the same being susceptible of much modification without departing from the spirit of my invention.

It will be understood that either the silt removing means, or the ditch forming means may be used separately on different vehicles, or may be used coöperatively as described above, and that any sub-combination hereinbefore described is susceptible of use on other types of ditch cleaners without departing from the spirit of my invention.

I sometimes contemplate using a positive return mechanism for returning the movable bucket member to its normal position after the silt has been discharged from the bucket; and this positive return mechanism, which may be used either in connection with, or as a substitute of the resilient spring means 171, is illustrated in Figs. 31, 32 and 33, and will now be described.

A bearing bracket 434 is rigidly secured on the rear or outer face of the stationary portion 142 of each bucket, and said bracket carries the two bearing standards 435 and 436. These bearing standards carry a bell crank having the two arms 437 and 438, the said bell crank being pivotally mounted in said standards by means of pin 439. For the purpose of preventing the bell crank and the pin 439 from sliding out of the bearing standards, a set collar 440 having a set screw 441 is provided on the pin 439 adjacent the bearing standard 436. One extremity of a link 442 is carried in the extremity of bell crank arm 438, and the other extremity of said link permanently latches into an aperture 443 of an angle-iron clip 444, the said clip being firmly and permanently secured to finger 180 of the movable bucket portion. The outer extremity of bell crank arm 437 carries a stud 445 on which the roller follower 446 rolls. For the purpose of operating the positive return mechanism above described, a suitably formed closing cam 447 is mounted beyond the track or opening cam 181, and said closing cam is supported by means of braces 448, Fig. 33. Fig. 32 shows cam 447 to be circularly formed about shaft 103 of the bucket wheel, and Fig. 31 shows the general plane of said cam to be extended at an angle with respect to shaft 103, the roller follower being adapted to coöperate with the outer face 449.

In the course of normal operation, the buckets will travel in the direction indicated by arrows 450, Figs. 31 and 32, and after the bucket fingers 180 have coöperated with the opening cam 181 to discharge the silt from the bucket, the roller follower 446 will come into coöperation with cam 447. As the forward motion of the bucket continues, the closing cam will force follower 446 outward so as to rotate the bell crank about pin 439 in the direction indicated by arrow 451, Fig. 31. This motion of the bell crank will be imparted to link 442, and the latter coöperating with the movable bucket portion through angle-irons 444, will be moved forward in such manner as to rotate said movable portion into its normal and extended position. It will be understood, of course, that when the bucket comes to its silt discharging position, the said bucket will be opened by means of finger 180 and the opening cam 181 as previously described.

The positive return mechanism just described, is preferably used in connection with the resilient spring means 171, the latter serving the double function of assisting in returning the bucket parts to their normal position, and also of maintaining said bucket parts in their normal position, after the positive return mechanism has passed beyond the closing cam 447. By providing this positive return mechanism so as to assist spring means 171, the bucket members will be operated with absolute certainty regardless of the grade or character of silt handled, and also regardless of the condition of the operating parts. In many cases, of course, where the positive return mechanism is provided, the resilient spring means 171 may be discarded, except that in this event the movable bucket portion may be worked from its normal position after the closing cam 447 is past, so that the bucket parts may not be in position to suitably scoop and remove the silt.

I claim:—

1. In a cleaner for any silted ditch, a vehicle adapted to travel along said ditch, knife blades on said vehicle for forming inclined sides on the ditch, said knife blades having cutting edges extending downwardly and inwardly, and the plane of said blades behind said cutting edges being warped inwardly so as to move the cut silt inward toward the center of the ditch, and revolubly mounted buckets for removing the silt from the ditch.

2. In a cleaner for any silted ditch, a vehicle adapted to travel along said ditch, knife blades on said vehicle for forming inclined sides on the ditch, said knife blades having cutting edges extending downwardly, inwardly and rearwardly, and the plane of said blades behind said cutting edges being warped inwardly so as to move the cut silt inward toward the center of the ditch, and revolubly mounted buckets for removing the silt from the ditch.

3. In combination, a vehicle, a bucket wheel revolubly mounted on said vehicle, and knives extending from adjacent the periphery of the bucket wheel aslant forward and upward and laterally away from said bucket wheel and provided with rear extensions, the lower portions of said knives lying in a vertical plane and the upper rear portions of said knives being warped to form inwardly and downwardly deflecting portions close to the periphery of the bucket wheel.

4. In a cleaner for any silted ditch, a bucket adapted to rotate constantly around an axis while the cleaner is in operation, said bucket being adapted to scoop into and clean the silt from the ditch, and the containing part of said bucket being divided into two substantially concentrically curved parts, the scooping part being rigidly mounted and the other part being movably mounted so as to telescope over each other thereby forcing the silt loose from the bucket.

5. In a cleaner for any silted ditch, a series of buckets mounted so as to successively scoop into and clean the silt from the ditch, each bucket comprising a concentrically-curved bottom or outside member held rigid in the train and having a mouth provided with a cutting edge, and a concentrically curved top or inside member concentrically telescoping with the rigid member, normally extended and circumferentially retractable.

6. In a cleaner for any silted ditch, the combination of a vehicle adapted to travel along the ditch, and a series of buckets revolubly mounted thereon and adapted to scoop into and carry the silt out of the ditch, each bucket comprising a concentrically-curved bottom or outside member held rigid in the train and having a mouth provided with a cutting edge, and a concentrically curved top or inside member concentrically telescoping with the rigid member, normally extended and circumferentially retractable, and a scraper actuated by said inside member to scrape the silt from the remaining portion of said stationary member.

7. In a cleaner for any silted ditch, buckets adapted to scoop into and clean the silt from the ditch, the containing part of each bucket comprising a concentrically-curved bottom or outside member held rigid in the train and having a mouth provided with a cutting edge, and a concentrically curved top or inside member concentrically telescoping with the rigid member, normally extended and circumferentially retractable, and means for movably mounting said buckets.

8. In a cleaner for any silted ditch, a wheel revolving on an approximately horizontal axis; a series of buckets carried in a circular path upon said wheel near its periphery and adapted to scoop into the silt and to clean it from the ditch when the buckets are near the lower part of said path; each bucket having a cutting, scooping and containing member regularly mounted upon said wheel near its periphery, said member being provided with a curved bottom surface curved correspondingly to the curved bottom surface of the first member; the second member being concentrically and operatively mounted within the first member in such a manner that its bottom is enabled to slide between the silt in the bucket and the curved bottom surface of the first member, thereby loosening the silt; an operating finger on the second member; and means coöperating with said finger for sliding the second member between the first member and the silt in the bucket.

9. In a cleaner for any silted ditch, movably mounted buckets adapted to scoop into and clean the silt from the ditch, the containing portion of said buckets comprising a concentrically-curved bottom or outside member held rigid in the train and having a mouth provided with a cutting edge, and a concentrically curved top or inside member concentrically telescoping with the rigid member, normally extended and circumferentially retractable, means for telescoping said parts onto each other when the buckets reach their discharging position, and means for again extending said parts beyond each other after the discharging position is passed.

10. In a cleaner for any silted ditch, movably mounted buckets adapted to scoop into and clean the silt from the ditch, each bucket comprising a concentrically-curved bottom or outside member held rigid in the train and having a mouth provided with a cutting edge, and a concentrically curved top or inside member concentrically telescoping with the rigid member, normally extended and circumferentially retractable, means for telescoping said parts onto each other to loosen the silt as the buckets approach the discharging position and resilient means for again extending said parts beyond each other after the buckets pass the discharging position.

11. In a ditch cleaner, a series of buckets movably mounted so as to successively scoop into and clean silt from a ditch, said buckets having a bottom member comprising a curved portion and a substantially flat portion, said flat portion being located in advance of the curved portion and serving to dig into the silt and pass it back into the curved portion, means for loosening the silt from the flat portion, and separate means for loosening the silt from the curved portion of the bucket.

12. In a ditch cleaner, a series of buckets movably mounted so as to successively scoop into and clean silt from a ditch, said buckets having a bottom member comprising a curved portion and a substantially flat portion, said flat portion being rigidly located in advance of the curved portion and serving to dig into the silt and pass it back into the curved portion, scrapers and concentrically telescoping means operating the scrapers for loosening the silt from the flat portion.

13. In a cleaner for any silted ditch, a bucket comprising a member having a cylindrical portion and a substantially flat portion extending tangentially from said cylindrical portion, a second cylindrical member slidably mounted on said first member and adapted to loosen the silt from the cylindrical portion of said first member, and means for loosening the silt from the substantially flat portion of said first member.

14. In a ditch cleaner, a series of buckets adapted to scoop into and clean silt from the ditch, said buckets comprising a rigid member having a curved portion and a substantially flat portion, said flat portion being located in advance of the curved portion and serving to dig into the silt and carry it back into the curved portion, a second member of the bucket coöperating with the first member to hold the silt passed into the bucket, said second member being slidably mounted so as to telescope with the first member, and means for loosening the silt from the substantially flat portion of the first member of the bucket.

15. In a cleaner for any silted ditch, a bucket comprising a member having a cylindrical portion and a substantially flat portion extending tangentially from said cylindrical portion, a second cylindrical member on the said first member and adapted to loosen and scrape the silt from the cylindrical portion of said first member, and scrapers adapted to scrape the silt from said substantially flat portion of said first member.

16. In a cleaner for any silted ditch, a bucket comprising a member having a cylindrical portion and a substantially flat portion extending tangentially from said cylindrical portion, a second cylindrical member on said first member and adapted to loosen the silt from the cylindrical portion of said first member, and movable scrapers adapted to loosen the silt from the substantially flat portion of said first member, and means carried on said second cylindrical member for moving said scrapers.

17. In a cleaner for any silted ditch, a bucket comprising a member having a cylindrical portion and a substantially flat portion extending tangentially from said cylindrical portion, a second cylindrical member on said first member and adapted to scrape the silt from the cylindrical portion of said first member, movable scraping blades adapted to scrape the silt from the substantially flat portion of said first member, and means carried on said second cylindrical member for operating said scraping blades after said cylindrical member has scraped a portion of the said first member.

18. In a cleaner for any silted ditch, a bucket comprising a member having a cylindrical portion and a substantially flat portion extending tangentially from said cylindrical portion, a second cylindrical portion movably mounted on said first member and adapted to loosen the silt from the cylindrical portion of said first member, scrapers adapted to loosen the silt from the substantially flat portion of said first member, means carried by said second cylindrical member for moving the scrapers, means for moving said second cylindrical member and scrapers when the dumping position is reached, and means for re-setting said second cylindrical member and scrapers after the dumping position is passed.

19. A ditch cleaner comprising a vehicle adapted to travel along a ditch, a wheel revolubly mounted on said vehicle, dividers mounted on the periphery of said wheel, and buckets on said wheel extending out sidewise beyond said dividers, said buckets being adapted to scoop into and clean the ditch, a flat bottom divider being positioned adjacent each bucket and moving therewith so that each divider will divide and directly feed the silt into a bucket.

20. In a ditch cleaner the combination of a wheel in which the periphery comprises a cylindrical surface with its axis in the axis of the wheel, buckets mounted upon and extending out from both sides of said wheel, and dividers mounted on said cylindrical periphery of the wheel and projecting therefrom for dividing the silt and moving it out sidewise from under said cylindrical periphery so that the buckets can reach it and scoop it up.

21. In a ditch cleaner, the combination of a flat bottom divider wheel, buckets mounted directly on said wheel and reaching out sidewise in opposite directions therefrom, said divider wheel extending out peripherally at least as far as the scooping edge of the bucket so as to leave no part of the base of the ditch uncleaned.

22. In a cleaner for any silted ditch, a revoluble wheel, buckets carried near the periphery of said wheel and adapted to scoop into and clean the silt from the ditch when near the lower part of the wheel and adapted to dump the cleanings when near the upper part of the wheel, an inclined apron mounted on said wheel and adapted to guide the dumpings from said buckets, a stationarily mounted hopper adapted to receive the dumpings from said apron, the sides of said hopper being adapted to scrape and clean the face of said apron, and a baffle-plate in said hopper and extending up behind said apron.

23. In a cleaner for any silted ditch, a revoluble wheel, buckets carried near the periphery of said wheel and adapted to scoop into and clean the silt from the ditch when near the lower part of the wheel, and adapted to dump the cleanings when near the upper part of the wheel, an inclined apron mounted on said wheel and adapted to guide the dumpings from said buckets, a stationarily mounted hopper adapted to receive the dumpings from said apron, and a baffle-plate secured to said hopper and having its upper edge projecting under the lower edge of said apron to prevent spilling.

24. In a cleaner for any silted ditch, a revoluble wheel, buckets carried near the periphery of the wheel and extending transversely thereof, said buckets being adapted to scoop into and clean the silt from the ditch when near the lower part of the wheel, said buckets being also adapted to drop the silt when near the upper part of the wheel, an inclined apron mounted between said buckets and within the space formed by their overhang, said apron forming no part of said buckets but being adapted to receive the silt dropped therefrom and guide it outward.

25. In a cleaner for any silted ditch, a revoluble wheel, buckets carried near the periphery of the wheel and extending transversely thereof, said buckets being adapted to scoop into and clean the silt from the ditch when near the lower part of the wheel, said buckets being also adapted to drop the silt when near the upper part of the wheel, inclined aprons extending in opposite directions from each other and being mounted between said buckets and in the space formed by their overhang, said aprons forming no part of said buckets but being adapted to receive the silt dropped from the buckets and guide it outward in opposite directions.

26. In a ditch cleaner, a wheel revolubly mounted, buckets, the containing part of these buckets being formed of a plurality of similarly formed telescoping members mounted on said wheel in pivotal relation to one another, the cutting and scooping members being rigid, means to turn the wheel, and means operable by turning of the wheel to telescope said bucket members together.

27. In a cleaner for any silted ditch, rotatably mounted buckets, each bucket comprising a stationary member and a movable member, and positive return mechanism for returning the movable bucket member to its normal position after the silt has been discharged from said bucket, said positive return mechanism including a bell crank mounted on the stationary bucket member and also means for connecting one arm of said bell crank to the movable member.

28. In a ditch cleaner, rotatably mounted buckets, each bucket comprising a stationary member and a movable member, and positive return mechanism for returning the movable bucket member to its normal position after the silt has been discharged from said bucket, said positive return mechanism including a bell crank mounted on the stationary bucket member and a stationarily mounted returning cam coöperating with said return mechanism, said cam being mounted on the ditch cleaner so as to be stationary with respect to the buckets.

29. In a cleaner for any silted ditch, a bucket comprising a stationary member and a movable member, the movable member being adapted to slide along a portion of said stationary member to loosen the silt from that portion of said stationary member, and means actuated by said movable member to loosen the silt from the remaining portion of said stationary member.

30. In a cleaner for any silted ditch, a bucket comprising a stationary member and a movable member, the movable member being adapted to slide along a portion of the stationary member to loosen the silt from said portion, and a scraper actuated by said movable member to scrape the silt from the remaining portion of said stationary member.

31. An endless train of buckets, each bucket comprising a concentrically-curved bottom or outside member held rigid in the train and having a mouth provided with a cutting edge, and a concentrically curved top or inside member concentrically telescoping with the rigid member, normally extended and circumferentially retractable.

32. A vehicle adapted to travel, knife blades on said vehicle for forming inclined sides on a ditch, said knife blades having cutting edges extending downwardly and inwardly and the plane of said blades behind said cutting edges being warped inwardly.

In testimony whereof, I have hereunto set my hand at Hollywood, California, this 17th day of December, 1912.

MOSES SCHLATTER.

In presence of—
JAMES R. TOWNSEND,
ROBERT R. STEPS.